United States Patent
Kamoi

(10) Patent No.: US 10,162,579 B2
(45) Date of Patent: Dec. 25, 2018

(54) IMAGE FORMING APPARATUS AND CONTROL METHOD FOR SETTING AND HOLDING PRINT SETTINGS

(71) Applicant: CANON KABUSHIKI KAISHA, Tokyo (JP)

(72) Inventor: Keiko Kamoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/653,407

(22) Filed: Jul. 18, 2017

(65) Prior Publication Data
US 2018/0024788 A1    Jan. 25, 2018

(30) Foreign Application Priority Data
Jul. 22, 2016   (JP) ................. 2016-144507

(51) Int. Cl.
*G06F 3/12*   (2006.01)
(52) U.S. Cl.
CPC .......... *G06F 3/1229* (2013.01); *G06F 3/1204* (2013.01); *G06F 3/1222* (2013.01); *G06F 3/1238* (2013.01); *G06F 3/1257* (2013.01); *G06F 3/1267* (2013.01); *G06F 3/1285* (2013.01)
(58) Field of Classification Search
CPC .................................................. G06F 3/1229
USPC ..................................................... 358/3.28
See application file for complete search history.

(56) References Cited

U.S. PATENT DOCUMENTS

2008/0158613 A1* 7/2008 Suzuki ................. G03G 15/50
                                                                      358/3.28
2014/0368854 A1* 12/2014 Iwadate ............... G06K 15/027
                                                                      358/1.13
2015/0188903 A1* 7/2015 Mitsubori ............ H04L 63/083
                                                                      358/1.14

FOREIGN PATENT DOCUMENTS

JP    2015-2372 A    1/2015

* cited by examiner

*Primary Examiner* — Jacky X Zheng
(74) *Attorney, Agent, or Firm* — Canon U.S.A., Inc. IP Division

(57) ABSTRACT

An image forming apparatus includes a processor, and a memory storing instructions, when executed by the processor, causing the image forming apparatus to function as a reception unit configured to receive image data from an information processing apparatus, a printing unit configured to print an image based on the image data, an acceptance unit configured to accept a user operation for issuing an instruction to start printing, a first print control unit configured to cause the printing unit to print an image generated from the image data received by the reception unit, and a second print control unit configured to cause the printing unit to print an image obtained by adding a predetermined pattern image to an image generated from the image data received by the reception unit, wherein the second print control unit starts printing according to the user operation being accepted by the acceptance unit.

12 Claims, 12 Drawing Sheets

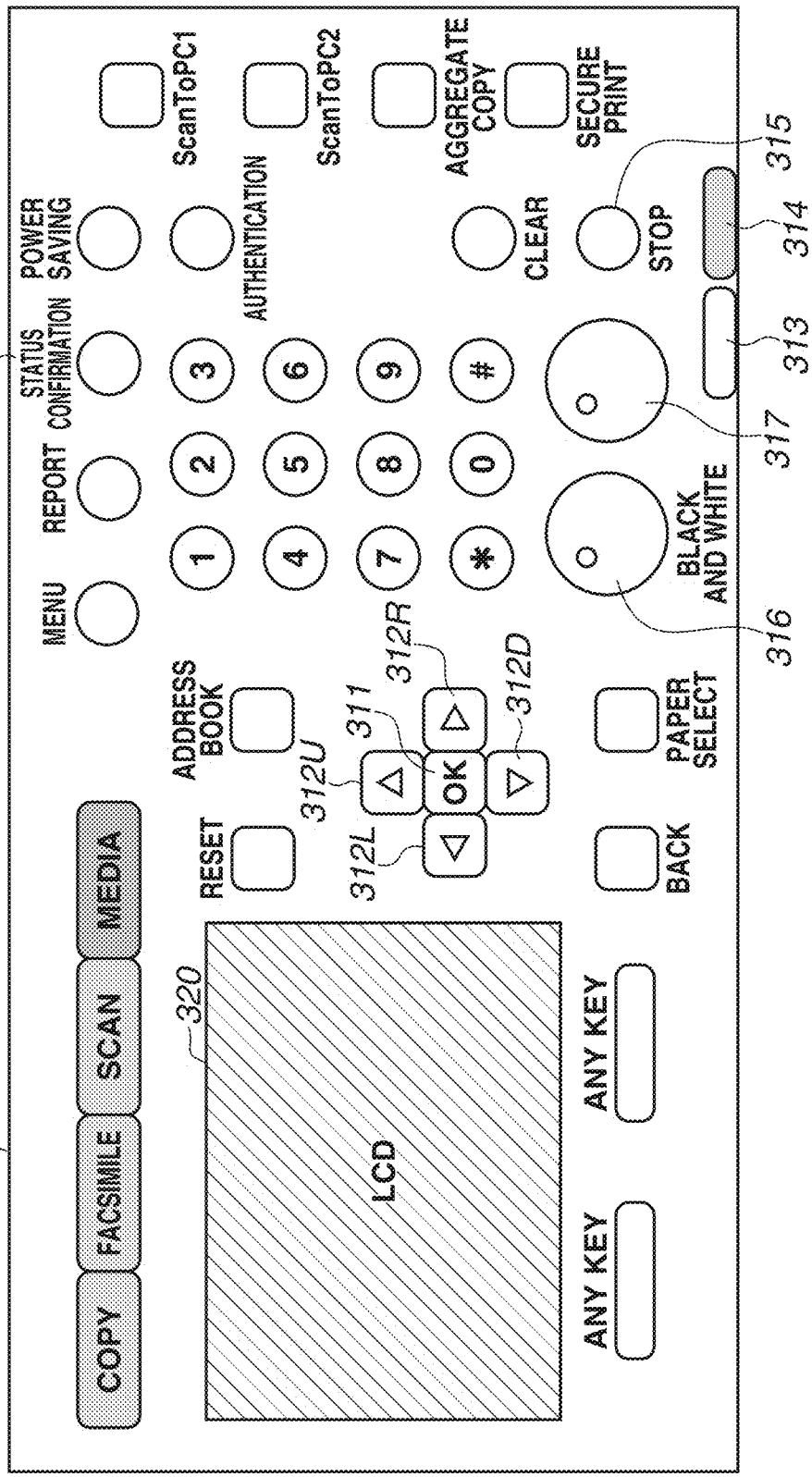

FIG.4A1 900
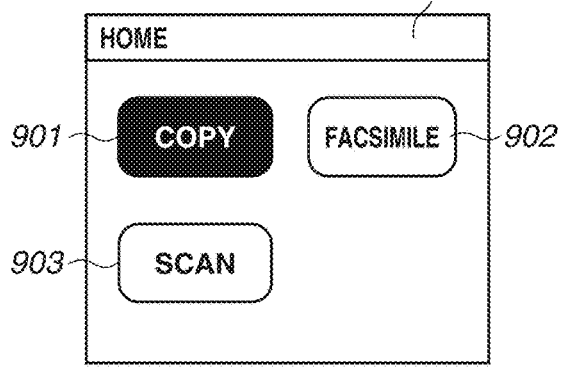
FIG.4A2
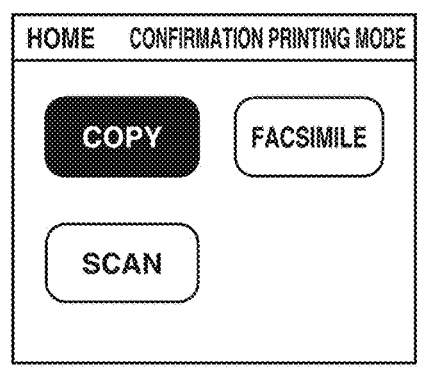
FIG.4B1 400
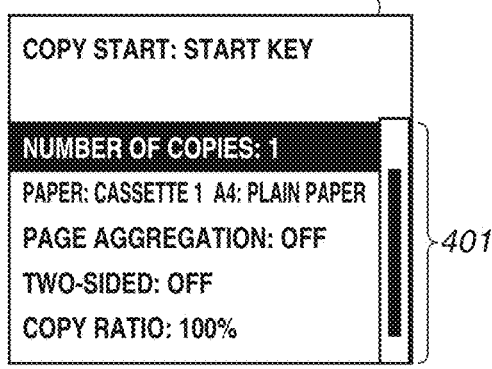
FIG.4B2 400
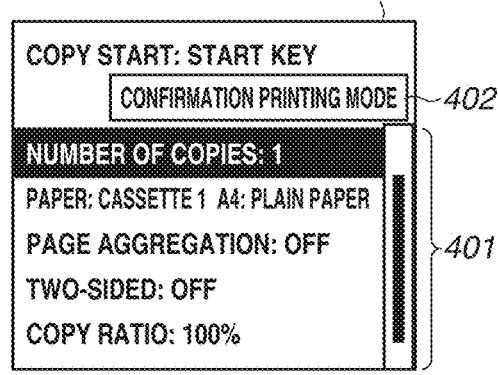
FIG.4C1 500
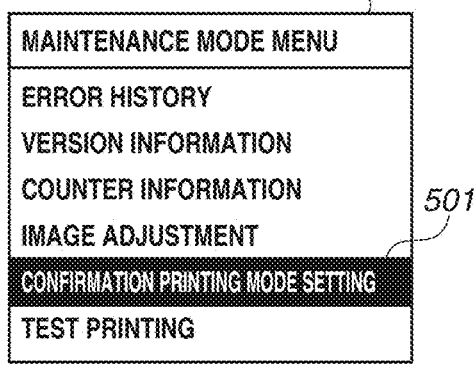
FIG.4C2 500
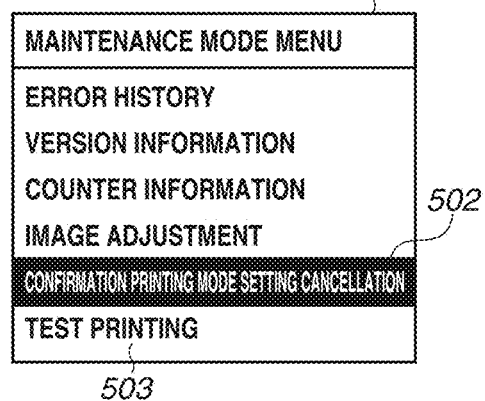

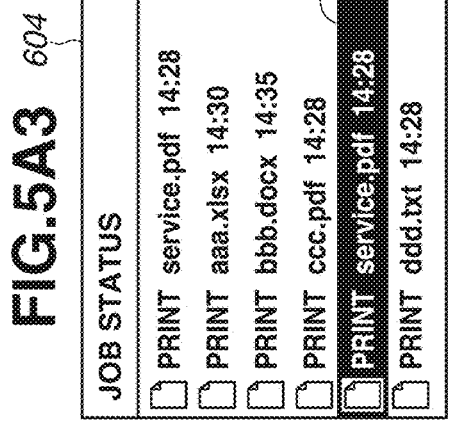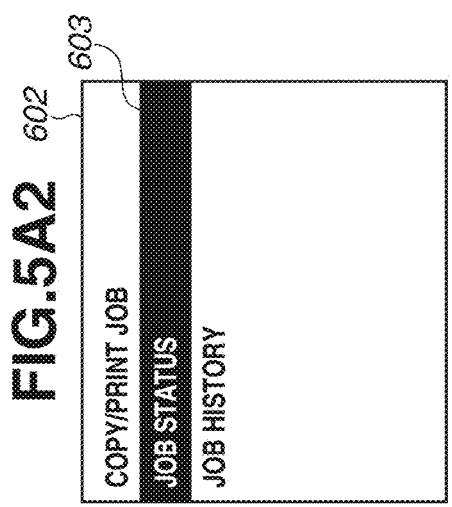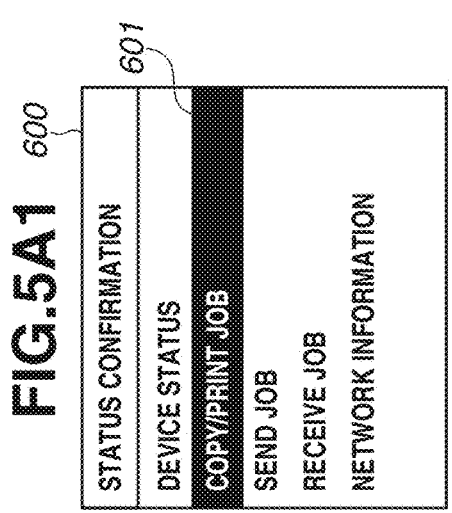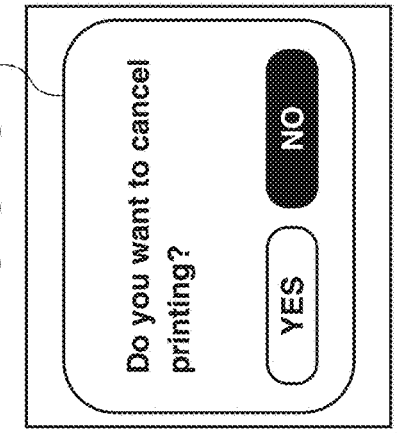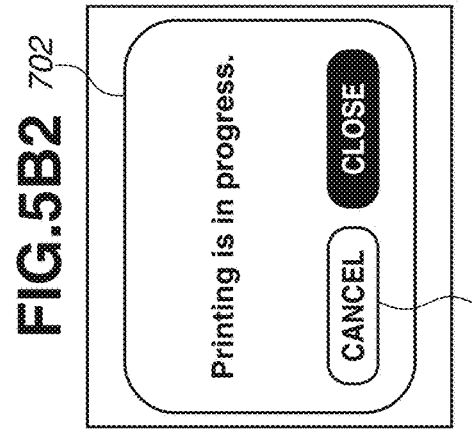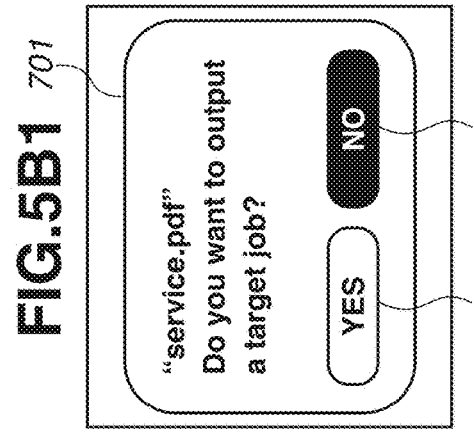

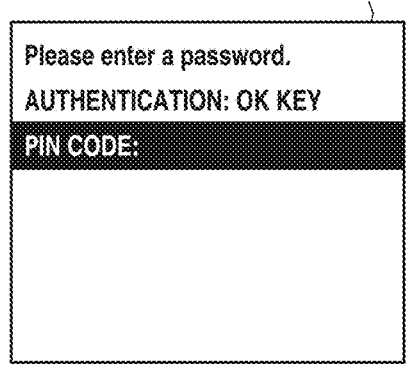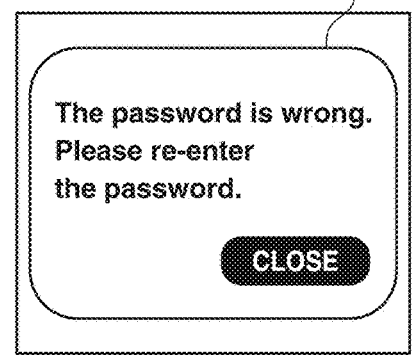

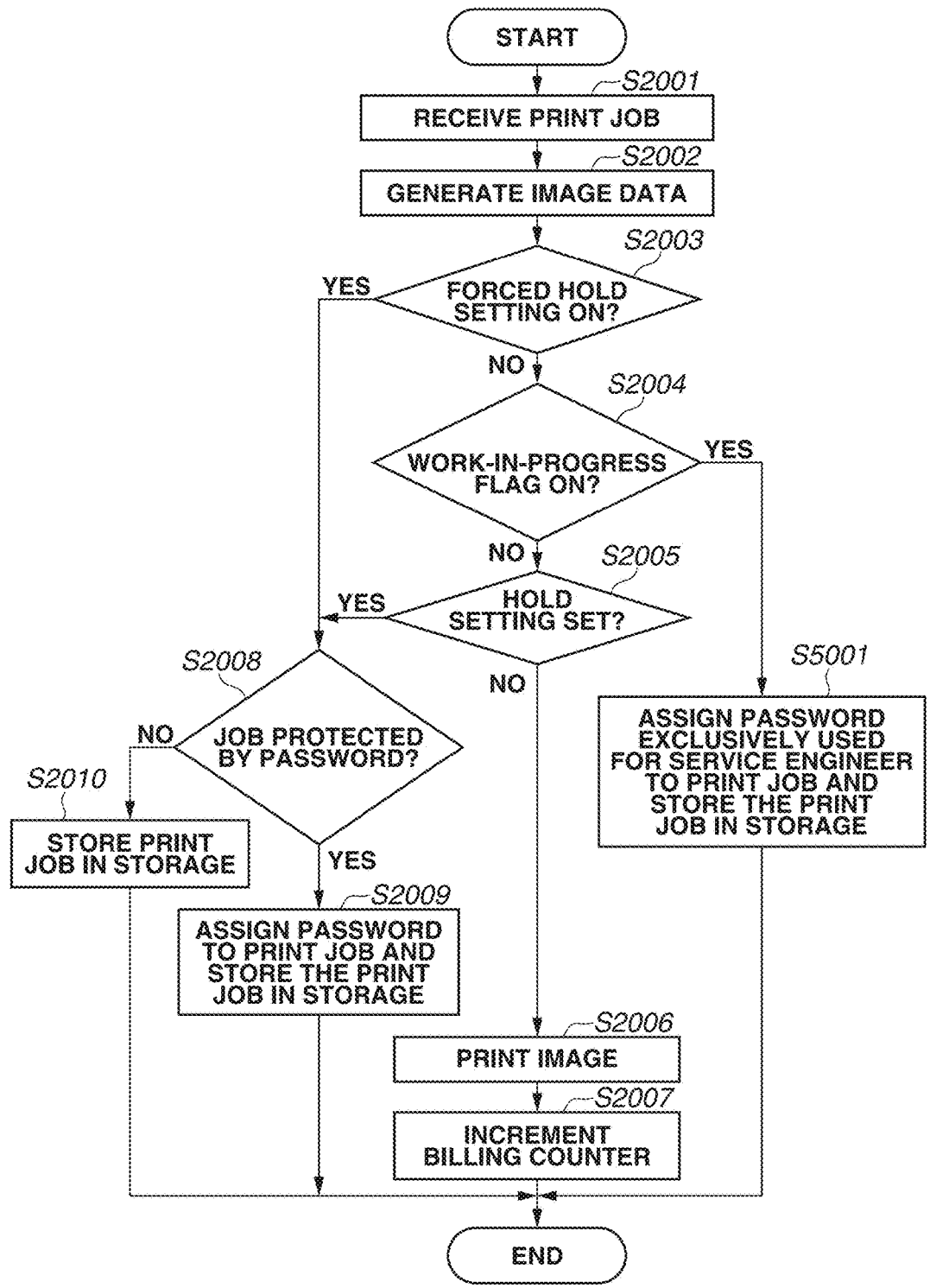

IMAGE FORMING APPARATUS AND CONTROL METHOD FOR SETTING AND HOLDING PRINT SETTINGS

BACKGROUND

Field of the Disclosure

Aspects of the present disclosure generally relate to an image forming apparatus, a control method therefor, and a storage medium.

Description of the Related Art

Operation modes of an image forming apparatus having a printing function, such as printing or copying, include, in addition to a normal mode, which the user ordinarily uses, a confirmation printing mode, in which the service engineer performs a printing operation to confirm whether printing is correctly performed by the image forming apparatus. In the confirmation printing mode, the service engineer transmits image data from an information processing apparatus, such as a personal computer (PC), of the user to the image forming apparatus, and causes the image forming apparatus to perform confirmation printing. Japanese Patent Application Laid-Open No. 2015-2372 discusses that a printed material obtained by printing in the confirmation printing mode has a predetermined pattern image, such as a lattice pattern, added thereto so as to indicate that this printing is confirmation printing.

Furthermore, there is an image forming apparatus capable of performing forced hold setting, in which the image forming apparatus does not start printing until a print start operation is performed by the user and starts printing according to the print start operation.

An image forming apparatus having the above two functions is able to use the confirmation printing mode and the forced hold setting together. Using the two functions enables preventing the image forming apparatus from starting printing of an image immediately after receiving image data in the process of the confirmation printing mode. In this way, even if a general user inadvertently transmits image data to an image forming apparatus without being aware that the image forming apparatus is in the process of the confirmation printing mode, printing with the addition of a lattice pattern is not immediately started. Configuring an image forming apparatus in such a way as not to start printing immediately after receiving image data enables giving the user an opportunity of becoming aware that the image forming apparatus is under maintenance, for example, coming to the installation location of the image forming apparatus before printing is started and becoming aware that the image forming apparatus is under maintenance.

In a case where the forced hold setting is set to OFF when the normal mode is set, using the confirmation printing mode and the forced hold setting together at the time of setting the confirmation printing mode requires the following operation.

When setting the confirmation printing mode, the service engineer starts the forced hold setting, and, when canceling the confirmation printing mode, the service engineer cancels the forced hold setting. These operations are manually performed by the service engineer and are, therefore, troublesome.

SUMMARY

According to an aspect of the present disclosure, an image forming apparatus includes a processor, and a memory storing instructions, when executed by the processor, causing the image forming apparatus to function as a reception unit configured to receive image data from an information processing apparatus, a printing unit configured to print an image based on the image data, an acceptance unit configured to accept a user operation for issuing an instruction to start printing, a first print control unit configured to cause the printing unit to print an image generated from the image data received by the reception unit, and a second print control unit configured to cause the printing unit to print an image obtained by adding a predetermined pattern image to an image generated from the image data received by the reception unit, wherein the second print control unit starts printing according to the user operation being accepted by the acceptance unit.

Further features of the present disclosure will become apparent from the following description of exemplary embodiments with reference to the attached drawings.

BRIEF DESCRIPTION OF THE DRAWINGS

FIG. 3 illustrates an appearance of an operation unit of the MFP according to one or more aspects of the present disclosure.

FIGS. 4A1, 4A2, 4B1, 4B2, 4C1, and 4C2 each illustrate an example of an operation screen which is displayed on a display according to one or more aspects of the present disclosure.

FIGS. 5A1, 5A2, 5A3, 5B1, 5B2, 5B3, 5C1, and 5C2 each illustrate an example of an operation screen which is displayed on the display according to one or more aspects of the present disclosure.

FIG. 11 is a flowchart illustrating processing performed at the time of receiving a print job according to one or more aspects of the present disclosure.

DESCRIPTION OF THE EMBODIMENTS

Various exemplary embodiments, features, and aspects of an image forming apparatus will be described in detail below with reference to the drawings.

First, a first embodiment is described.

Figure 1:
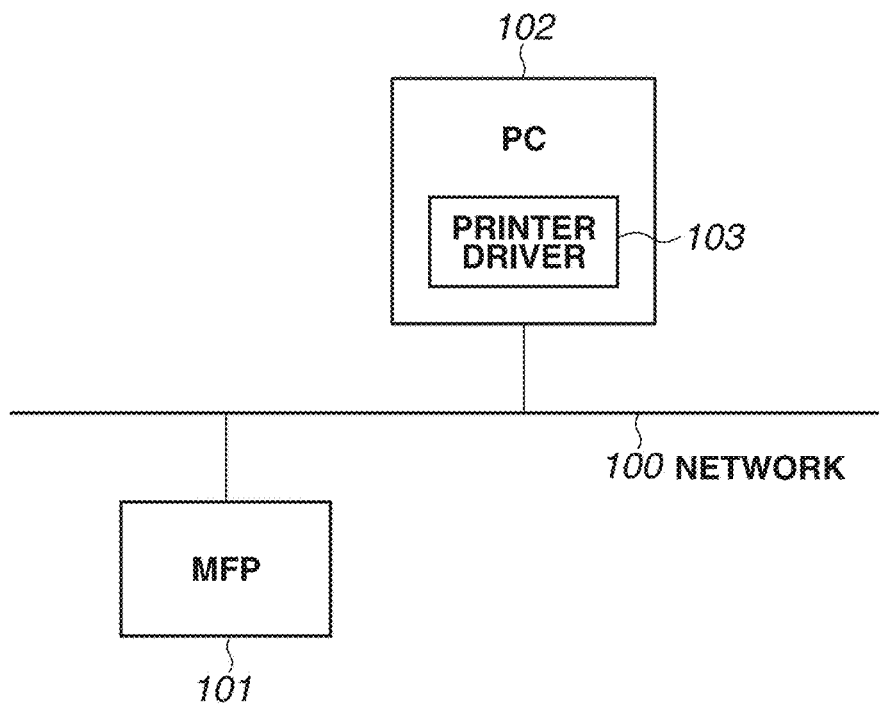
FIG. 1 is an overall view of an image forming system according to one or more aspects of the present disclosure.

FIG. 1 is a block diagram illustrating an image forming system according to the present exemplary embodiment. A multifunction peripheral (MFP) 101 and a personal computer (PC) 102 are interconnected in such a way as to be able to communicate with each other on a network 100. In the present exemplary embodiment, the MFP 101 is used as an example of an image forming apparatus, and the PC 102 is used as an example of an information processing apparatus. The MFP 101 and the PC 102 are connected to the Internet (not illustrated) via the network 100, and the MFP 101 is able to receive print data from the PC 102.

First, the PC 102 is described. The PC 102 has a printer driver 103 installed thereon. The PC 102 is able to transmit generated image data to an external apparatus (in the present exemplary embodiment, the image forming apparatus 101) via the network 100.

Next, the MFP 101 is described. The MFP 101 includes a reading unit, which reads an image on a sheet. The MFP 101 further includes a printing unit, which prints an image on a sheet based on image data read by the reading unit or image data received from the PC 102.

Figure 2:
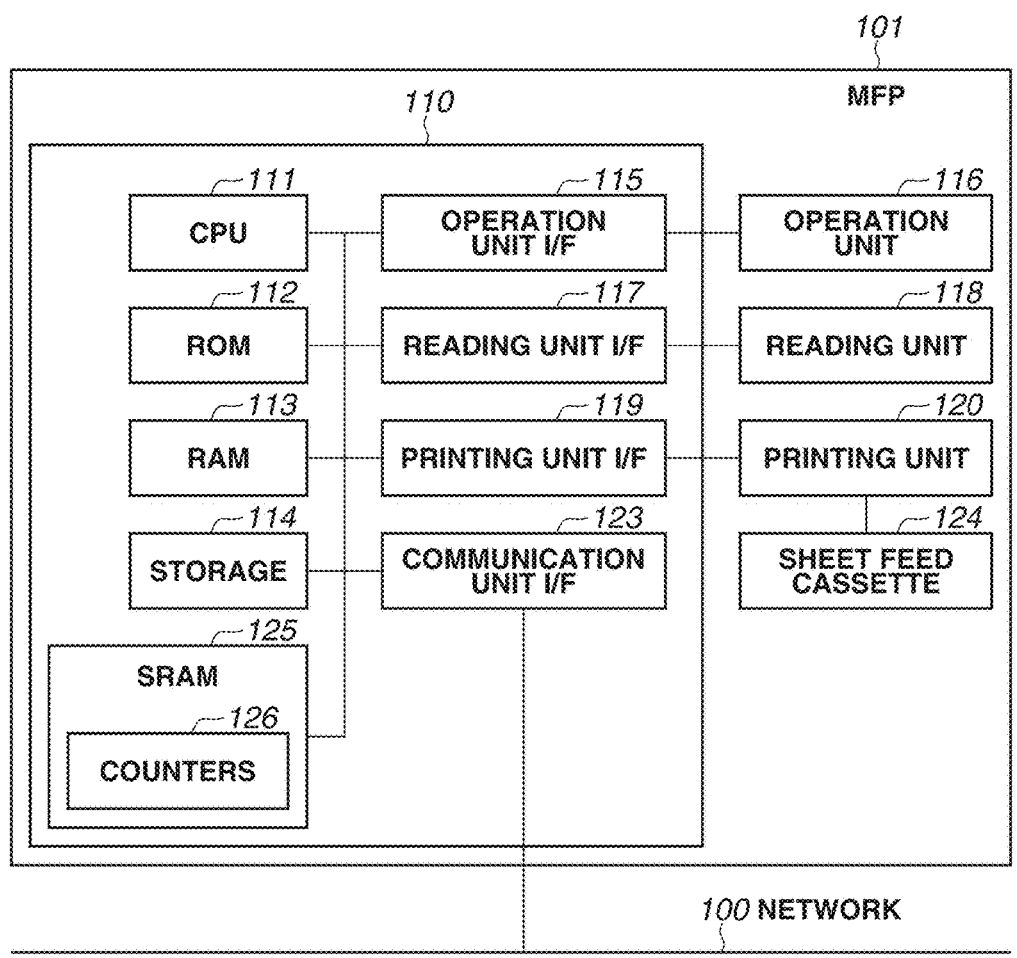
FIG. 2 is a block diagram illustrating a configuration of a multifunction peripheral (MFP) according to one or more aspects of the present disclosure.

FIG. 2 is a block diagram illustrating a configuration of the MFP 101 according to the present exemplary embodiment. A control unit 110, which includes a central processing unit (CPU) 111, controls the operation of the entire MFP 101. The CPU 111 reads out a control program stored in a read-only memory (ROM) 112 or a storage 114 and controls various units, such as a reading unit 118 and a printing unit 120, according to the control program. The ROM 112 stores control programs, which are executable by the CPU 111. Furthermore, the ROM 112 stores, for example, a boot sequence and font information. A random access memory (RAM) 113 is a main memory for the CPU 111 and is used as a work area. Moreover, the RAM 113 is used as a temporary storage area for loading various control programs stored in the ROM 112 and the storage 114. The storage 114 stores image data, print data, various programs, and various pieces of setting information. In the present exemplary embodiment, the storage 114 is supposed to be a flash memory. However, an auxiliary storage device other than the flash memory, such as a solid state device (SSD) or a hard disk drive (HDD), can be used as the storage 114.

Furthermore, while, in the MFP 101 according to the present exemplary embodiment, one CPU 111 and one memory (RAM 113) are used to perform various processing operations illustrated in the flowcharts described below, another configuration can be used. For example, a plurality of CPUs, RAMS, ROMs, and storages can cooperate with each other to perform various processing operations illustrated in the flowcharts described below. Moreover, a hardware circuit, such as an application specific integrated circuit (ASIC) or a Field Programmable Gate Array (FPGA), can be used to perform a part of the processing operations.

An operation unit interface (I/F) 115 connects the control unit 110 to an operation unit 116. The operation unit 116 is configured with a display, such as a liquid crystal display (LCD), and an input device, such as a touch panel, and operates to display information about the image forming apparatus to the user and to accept an input from the user.

A reading unit I/F 117 connects the control unit 110 to the reading unit 118. The reading unit 118 reads an image on a sheet and converts the image into image data such as binary data. The image data generated by the reading unit 118 is transmitted to an external apparatus, such as a PC, via a network or is printed on a sheet.

A printing unit I/F 119 connects the control unit 110 to the printing unit 120. The CPU 111 transfers image data targeted for printing to the printing unit 120 via the printing unit I/F 119. The printing unit 120 prints the received image on a sheet fed from a sheet feed cassette 124.

Furthermore, the control unit 110 is connected to the network 100 via a communication unit I/F 123. The communication unit I/F 123 operates to transmit image data or information to an external apparatus on the network 100 or to receive print data or information from an information processing apparatus on the network 100.

The method for transmitting and receiving print data via a network includes, for example, transmission and reception using an e-mail mentioned above. Besides, transmission and reception using a protocol, such as the File Transfer Protocol (FTP) or Server Message Block (SMB), can also be used. Moreover, the MFP 101 is able to transmit and receive facsimile data with respect to an external facsimile apparatus via a modem and a public switched telephone network (PSTN).

Furthermore, a static random access memory (SRAM) 125 is a non-volatile storage medium, and stores various pieces of counter information 126, such as a billing counter and a non-billing counter about the MFP 101. The MFP 101 described in the present exemplary embodiment is an MFP which performs billing to the user based on the number of printed sheets used for printing by the user. Therefore, the MFP 101 is equipped with a billing counter for managing the number of printed sheets used for printing by the user. A printed material used for printing by the service engineer to adjust various parameters of the MFP 101 or a test print used for printing performed after the adjustment is not the one printed by the user and, therefore, needs to be excluded from a target for billing. Accordingly, the MFP 101 is equipped with a non-billing counter for counting a test print used for printing by the service engineer, which is not a target for billing.

Next, a mechanism of billing management in the MFP 101 having the above configuration is described.

The MFP 101 causes the printing unit 120 to print an image based on image data input via the network 100 and the communication unit I/F 123 or input from the reading unit 118. Each time the printing unit 120 performs printing on one sheet based on image data, counting by the billing counter, which counts the number of printed sheets of the printed material targeted for billing, is incremented by one. Information about the number of printed sheets counted by the billing counter is able to be acquired by the PC 102, which is an external apparatus, and the amount of money to be charged to the user of the MFP 101 later is determined based on the acquired information.

The MFP 101 in the present exemplary embodiment has three operation modes, i.e., a "normal mode", a "maintenance mode", and a "confirmation printing mode".

The "normal mode" is an operation mode in which the general user performs an operation to use a copy function, a print function, a scanner function, and a facsimile function.

The "maintenance mode" is an operation mode in which the service engineer uses the MFP 101, and is an operation mode used for the service engineer to perform maintenance work on the MFP 101. The maintenance work is, for example, work performed by the service engineer to confirm or change the settings of various parameters of the MFP 101 when the disturbance of an image or color drift occurs. Moreover, performing test printing for printing a test pattern for image adjustment is also included in the maintenance work. Additionally, for example, work for confirming counter information for counting the number of printed sheets used for printing or confirming the version of firmware or software of the MFP 101 is also included in the maintenance work.

The "confirmation printing mode" is a mode in which the service engineer uses a copy or print function. This mode is used in a case where the service engineer performs normal copying or printing after performing maintenance such as image color adjustment. The service engineer checks a printed result obtained for printing and determines whether adjustment has been correctly performed in such a manner that there occurs no disturbance of color and image. Printing performed by the printing unit 120 when the confirmation printing mode is set is test printing. A printed material which is printed as test printing is obtained by superimposing a predetermined pattern, such as a lattice pattern, on an image to be printed. In this way, performing printing with, for example, a predetermined pattern superimposed enables readily recognizing which is a printed material obtained by the service engineer performing test printing.

At the time of setting the confirmation printing mode, the service engineer once changes the operation mode from the normal mode to the maintenance mode. Then, the service engineer sets the confirmation printing mode from a maintenance mode menu screen for the maintenance mode. Furthermore, at the time of canceling the confirmation printing mode, the service engineer also once changes the operation mode to the maintenance mode and then ends the confirmation printing mode from the maintenance mode menu screen. Moreover, besides the above method, the confirmation printing mode is canceled according to the elapse of a predetermined time after the service engineer sets the confirmation printing mode.

Furthermore, a copy job or print job performed in the maintenance mode or the confirmation printing mode is a copy job or print job used by the service engineer to adjust the image forming apparatus and is, therefore, excluded from a target for billing. Therefore, in a case where a copy job or print job is performed in the maintenance mode or the confirmation printing mode, counting in the non-billing counter is updated as much as the number of printed sheets.

The MFP 101 operates in any one of the above-mentioned three operation modes, i.e., "normal mode", "maintenance mode", and "confirmation printing mode, and operation screens which are displayed in the respective operation modes are different from each other. The operation screens in the respective operation modes are described below with reference to FIGS. 4A1, 4A2, 4B1, 4B2, 4C1, and 4C2 and FIGS. 5A1, 5A2, 5A3, 5B1, 5B2, 5B3, 5C1, and 5C2.

FIG. 3 is an appearance diagram of the operation unit 116 of the MFP 101. The operation unit 116 is configured with a display 320, which displays an operation screen described below, and various types of hard keys. The display 320 is provided in such a way as to be integrated with a touch panel. For example, the light transmittance of the touch panel is configured not to block displaying of the display 320, and the touch panel is mounted on the upper layer of the display 320. The input coordinates indicating the position where the user touches on the touch panel are associated with the display coordinates on the display 320. This way enables the user to perform an operation as if performing an operation while directly touching a screen displayed on the display 320. The display 320 and various types of hard keys can accept an instruction from the user.

The operation unit 116 is equipped with scroll keys 312U, 312D, 312L, and 312R, which are used to select options on the screen displayed on the display 320, and an OK key 311, which is used to determine the option selected by the scroll keys. The user is able to select one item from the options indicated on the screen displayed on the display 320 using the scroll keys 312 and the OK key 311. Moreover, the user is also able to directly touch an option displayed on the display 320 with the finger or a touch pen, such as a stylus, to determine the option.

A status confirmation button 302 is a key used to display a screen for confirming the status of the MFP 101 (a status confirmation screen) on the display 320. The status confirmation screen is a screen for displaying information about the device of the MFP 101, such as the serial number of the MFP 101 and the state of cartridges, and the status of a copy or print job. The user is able to confirm the status of a print job that is in the process of being executed via the status confirmation screen.

A lamp 313 and a lamp 314 are provided to inform the user of the state of the MFP 101. The lamp 313 is turned on when an e-mail or a print job is in the process of being received or being executed, and the lamp 314 is turned on when some error, such as a paper jam or run-out of toner, has occurred.

A stop key 315 is used to issue an instruction to cancel a job. For example, when the stop key 315 is pressed during reception of image data from an external information processing apparatus, the MFP 101 stops receiving image data. Moreover, when the stop key 315 is pressed during printing, print processing is stopped.

Start keys 316 and 317 are buttons used to issue an instruction to start a job. When the start key 316 or 317 is pressed while a basic screen for each function, such as a copy function, a scan function, or a facsimile function, illustrated in FIGS. 4A1 and 4A2 is displayed on the display 320, processing associated with the function is started. The start key 316 and the start key 317 are a black-and-white start key and a color start key, respectively, and are used to issue an instruction to start a job in the respective color modes.

Buttons having functions similar to those of various keys described above can be displayed on the display 320, and processing can be performed in response to an input to the touch panel.

FIGS. 4A1, 4A2, 4B1, 4B2, 4C1, and 4C2 each illustrate an example of an operation screen which the CPU 111 displays on the display 320 of the operation unit 116.

FIG. 4A1 illustrates an example of a home screen displayed when the operation mode of the MFP 101 is the normal mode. Buttons used to display a basic screen for various functions of the MFP 101 are displayed in a home screen 900. The various functions include, for example, a copy function, a facsimile function, and a scan function. The user selects a function intended to be used with the scroll keys 312L, 312U, 312R, and 312D provided in the operation unit 116, and then presses the OK key 311 to determine the function intended to be used. Moreover, without the use of hard keys, the user can perform a touch operation on the display 320 to determine a function intended to be used.

A "copy" button 901 is a button used to display a basic screen for the copy function, and, according to the user touching or selecting the "copy" button 901, the basic screen for the copy function is displayed on the display 320. A "facsimile" button 902 is a button used to display a basic screen for the facsimile function. A "scan" button 903 is a button used to display a basic screen for the scan function.

FIG. 4A2 illustrates a home screen displayed when the operation mode of the MFP 101 is set to the confirmation printing mode. Indicating that the confirmation printing mode is set on the screen enables informing the service engineer that the operation mode that is currently set is the confirmation printing mode.

In the present exemplary embodiment, during setting of the confirmation printing mode, an indication indicating that the confirmation printing mode is currently set is displayed on the home screen. However, even when any one of the normal mode and the confirmation printing mode is set, a home screen which does not indicate the current operation mode illustrated in FIG. 4A1 can be displayed on the display 320.

FIG. 4B1 illustrates an example of a basic screen for the copy function displayed on the display 320 at the time of setting of the normal mode. When the user touches or selects the "copy" button 901 in the menu screen at the time of setting of the normal mode illustrated in FIG. 4A1, the basic screen for the copy function illustrated in FIG. 4B1 is displayed on the display 320.

The basic screen 400 for the copy function is configured with a display field capable of displaying character strings with seven rows arranged in the vertical direction. On the first row, a message enabling recognizing about which function the screen is provided is displayed. For example, since the screen illustrated in FIG. 4B1 is the basic screen for the copy function, a message indicating "copy start: start key" is displayed. On the second row, information indicating the current mode is displayed. However, in the case of the normal mode, displaying of the mode on the second row is not performed. Since the screen illustrated in FIG. 4B1 is the basic screen in the normal mode, displaying of the operation mode is not performed. In the description of the present exemplary embodiment, the MFP 101 is supposed not to display the second row in the case of the normal mode. Displaying of the mode on the second row can instead be performed in the case of the normal mode.

At an area 401 on the third to seventh rows, some setting items of each function are displayed. Since the screen illustrated in FIG. 4B1 is the basic screen displayed when the copy function is used, some setting items corresponding to the copy function are displayed. The highlighted item is an item that is currently selected, and the selected item can be changed by pressing any one of the scroll keys 312U and 312D. Moreover, when the user selects the OK key 311 while selecting a certain item, the user is able to change the setting of the selected item. Besides operating the scroll keys 312U and 312D and pressing the OK key 311, the user can touch a setting item intended to be set to change the setting thereof.

FIG. 4B2 illustrates an example of a basic screen for the copy function displayed on the display 320 at the time of setting the confirmation printing mode. When the user touches or selects the "copy" button in the menu screen at the time of setting of the confirmation printing mode illustrated in FIG. 4A2, the basic screen for the copy function in the process of the confirmation printing mode illustrated in FIG. 4B2 is displayed on the display 320. An indication 402 in FIG. 4B2 notifies the user that a set operation mode is the confirmation printing mode.

Since the operation mode of the MFP 101 is the confirmation printing mode, an indication indicating that the confirmation printing mode is currently set is displayed on the second row. This indication enables the service engineer to confirm that the current operation mode of the MFP 101 is the confirmation printing mode.

FIGS. 4C1 and 4C2 each illustrate an example of a maintenance mode menu screen which is displayed on the display 320. The maintenance mode menu screen 500 is displayed in response to the service engineer performing a special operation for starting the maintenance mode. The special operation for starting the maintenance mode is, for example, a special operation, such as inputting an identifier (ID) and a password exclusively used for the service engineer, long-pressing a predetermined key provided in the operation unit 116, or concurrently pressing a plurality of keys. The special operation for starting the maintenance mode is assumed to be known only by the service engineer and is not disclosed to the general user. Furthermore, the user authentication using, for example, an integrated circuit (IC) card exclusively used for the service engineer can be performed to start the maintenance mode.

FIG. 4C1 illustrates a maintenance mode menu screen which is displayed on the display 320 when a work-in-progress flag indicating whether the confirmation printing mode is currently set is OFF. A "confirmation printing mode setting" button 501 is a setting item used to issue an instruction to start the confirmation printing mode from the maintenance mode menu screen. According to the user touching or selecting the "confirmation printing mode setting" button 501, the MFP 101 sets the work-in-progress flag to ON.

FIG. 4C2 illustrates a maintenance mode menu screen which is displayed when the work-in-progress flag is ON. A "confirmation printing mode setting cancellation" button 502 is a setting item used to issue an instruction to end the confirmation printing mode. According to the service engineer touching or selecting the "confirmation printing mode setting cancellation" button 502, the MFP 101 ends the confirmation printing mode. In the present exemplary embodiment, besides the above method, the MFP 101 ends the confirmation printing mode when a predetermined time has elapsed after setting of the confirmation printing mode.

In the present exemplary embodiment, the above-mentioned two methods are set as a method for ending the confirmation printing mode. However, the confirmation printing mode can be ended by a method other than the above-mentioned methods. For example, the confirmation printing mode can be ended in a case where the service engineer does not perform any operation within a predetermined period during setting of the confirmation printing mode. Moreover, after a predetermined time elapses from the time of the last operation of the MFP 101 by the user and the MFP 101 enters a sleep state, the confirmation printing mode can be ended when the MFP 101 returns from the sleep state.

A "test printing" button 503 illustrated in FIGS. 4C1 and 4C2 is a button used to issue an instruction to print an image for checking the image disturbance or color drift of a printed material. Test printing is performed to print a predetermined image previously stored in the MFP 101. Since the test printing is printing of a special image for testing, printing is performed without superimposing a predetermined pattern image, such as a lattice pattern, at the time of printing. Moreover, the test printing is printing performed by the service engineer to adjust the MFP 101 and is, therefore, excluded from printed materials targeted for billing. Then, the number of printed sheets used for printing is counted by the non-billing counter in the SRAM 125.

To end displaying of the maintenance menu screen and end the maintenance mode, a special operation by the service engineer is required. The special operation is, for example, an operation of inputting an ID and a password exclusively used for the service engineer or long-pressing a button in the operation unit 116. The above special operation is assumed to be known only by the service engineer and is not disclosed to the general user. Moreover, besides the above-mentioned method, the maintenance mode is ended and displaying of the maintenance menu screen is ended according to the service engineer not performing any operation until a predetermined time or more elapses in the state in which the maintenance mode menu screen is displayed.

FIGS. 5A1, 5A2, 5A3, 5B1, 5B2, 5B3, 5C1, and 5C2 each illustrate an example of an operation screen which is displayed on the display 320 when the status confirmation button 302 of the operation unit 116 is pressed.

FIG. 5A1 illustrates an example of a status confirmation screen 600 which is displayed on the display 320 when the status confirmation button 302 is pressed. The status confirmation screen 600 is a screen used to display the serial number of the MFP 101, the state of a copy or print job, the states of a send job and a receive job, and network information such as an IP address. In the status confirmation screen 600, when the user touches or selects a "copy/print job" button 601 in the status confirmation screen 600, a copy/print job screen 602 illustrated in FIG. 5A2 is displayed on the display 320.

The copy/print job screen 602 illustrated in FIG. 5A2 is a screen used to display the status of a job or a job history in the copy function or the print function.

When the user touches or selects a "job status" button 603 in the copy/print job screen 602 illustrated in FIG. 5A2, the MFP 101 displays a job status screen 604 illustrated in FIG. 5A3 on the display 320.

In the job status screen 604, a list of jobs stored in the storage 114 is displayed on the display 320. In FIG. 5A3, in addition to the type of a job, the name of a job stored in the storage 114 and the time at which the job was stored are displayed. For example, a row 605 indicates that a print job for a document name "service.pdf" was stored at 2:28 p.m. In the present exemplary embodiment, when forced hold setting or hold setting for each print job is set to ON, a job received from the PC 102 is able to be stored in the storage 114. The forced hold setting is a setting which is set by the user via the display 320 in the MFP 101. In a case where the forced hold setting is set to ON, the CPU 111 stores a print job received from the PC 102 in the storage 114 irrespective of the setting performed in the printer driver 103. In the description of the present exemplary embodiment, the user is supposed to set the forced hold setting via the display 320 of the MFP 101. The method for setting the forced hold setting is not limited to the above method. For example, ON and OFF of the forced hold setting of the MFP 101 can be set via a PC connected to the MFP 101.

On the other hand, the hold setting for each print job is set with the use of the printer driver 103 in the PC 102. The CPU 111 determines whether the hold setting is set in the received print job. In a case where the hold setting for each print job is set, the CPU 111 holds the received print job in the storage 114. On the other hand, in a case where the hold setting for each print job is not set, the CPU 111 starts printing according to the reception of a print job from the PC 102.

Screens 701 to 703 respectively illustrated in FIGS. 5B1 to 5B3 each are an example of a pop-up screen according to the first exemplary embodiment. When the user selects a job to be printed in the job status screen 604, the screen 701 is displayed on the display 320. The screen 701 is a screen used to inquire of the user whether to print a job selected by the user. When the user selects a "yes" button 704 in the screen 701, a job-in-progress screen 702 illustrated in FIG. 5B2 is displayed on the display 320, and the MFP 101 starts printing of an image. In the first exemplary embodiment, pressing of the button 704 serves an instruction to start printing, so that printing is started. When the user selects a "no" button 705 in the screen 701, the MFP 101 displays the job status screen 604 on the display 320. In a case where the user presses a "cancel" button 706 in the job-in-progress screen 702 or presses the stop key 315 of the operation unit 116, a cancel confirmation screen 703 illustrated in FIG. 5B3 is displayed on the display 320. In a case where the user selects a "yes" button in the cancel confirmation screen 703, the MFP 101 cancels printing, and, in a case where the user selects a "no" button, the MFP 101 continues printing.

Screens 800 and 801 respectively illustrated in FIGS. 5C1 and 5C2 each are a screen displayed on the display 320 in a case where the print job selected in the job status screen 604 has a password assigned thereto.

A password entry screen 800 illustrated in FIG. 5C1 is a screen used for the user to enter a password, which is displayed in a case where the print job selected in the job status screen 604 has a password assigned thereto. The user enters the password using, for example, hard keys in the operation unit 116 and then presses the OK key 311. The MFP 101 performs authentication processing according to the OK key 311 being pressed.

An error screen 801 illustrated in FIG. 5C2 is a screen which is displayed on the display 320 in a case where the password entered by the user does not match the password assigned to the print job. When the user selects a "close" button, the password entry screen 800 is displayed on the display 320.

Here, the flow of an operation of the MFP 101 is described.

In the first exemplary embodiment, when the operation mode of the MFP 101 is the confirmation printing mode, a job received from the PC 102 via the network 100 is stored in the storage 114 of the MFP 101.

The service engineer transmits image data used for test printing from the PC 102, which is connected to the MFP 101 via the network 100, to the MFP 101.

The CPU 111 stores a print job received from the PC 102 in the storage 114, and adds information about the print job to a list of print jobs, which is displayed in the job status screen 604.

The service engineer operates the MFP 101, and selects the job received from the PC 102 from the list of jobs in the job status screen 604 to perform printing. Since the operation mode of the MFP 101 is the confirmation printing mode, the job selected by the service engineer is printing with a lattice pattern superimposed.

On the other hand, suppose that, during setting of the confirmation printing mode, the general user other than the service engineer transmits a print job from the PC 102 to the MFP 101 without being aware that the operation mode of the MFP 101 is the confirmation printing mode. During setting of the confirmation printing mode, a job received from the PC 102 is stored in the storage 114 irrespective of the setting performed in the PC 102. Therefore, even when the user transmits a print job, printing is never started immediately. With this, in a case where the user transmits an image to the MFP 101 without being aware that the MFP 101 is in the confirmation printing mode, printing of an image with a lattice pattern attached thereto can be prevented from being undesirably started before the user arrives at the installation location of the image forming apparatus (MFP 101).

Figure 6:
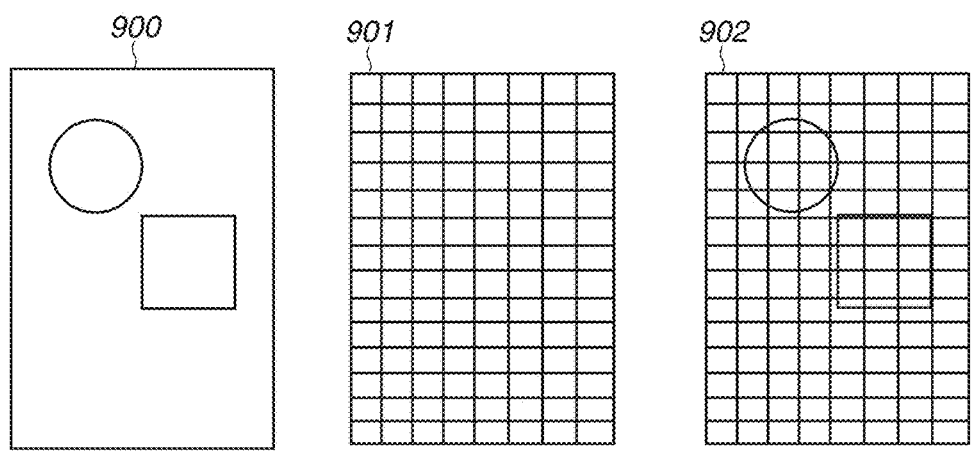
FIG. 6 illustrates examples of images to be printed according to one or more aspects of the present disclosure.

FIG. 6 illustrates examples of respective images to be printed when the normal mode and the confirmation printing mode are set.

An image 900 illustrated in FIG. 6 is an example of an image to be printed in the normal mode. When the normal mode is set, an image is printed based on image data received via the network 100. In a case where the normal mode is set, image data is generated according to the setting performed by the user via the printer driver 103, and an image is printed based on the generated image data.

An image 901 illustrated in FIG. 6 is an example of a pattern image to be superimposed on image data when the confirmation printing mode is set. In the present exemplary embodiment, a lattice pattern of the image 901 is superimposed on image data read by the reading unit 118 or image data received via the network 100.

An image 902 illustrated in FIG. 6 is an example of a printed material printed in the confirmation printing mode. In the confirmation printing mode, an image obtained by superimposing a predetermined pattern image, such as a lattice pattern, on the image data received via the network 100 is printed. In a case where the confirmation printing mode is set, in addition to the setting performed by the user via the printer driver 103, a pattern image of the image 901 is superimposed on the entire sheet used for printing. In this way, in the confirmation printing mode, since an image in which the setting performed by the user via the printer driver 103 is reflected is printed with a specific pattern image superimposed thereon, it is apparent that the printed material is a result of test printing.

Figure 7:
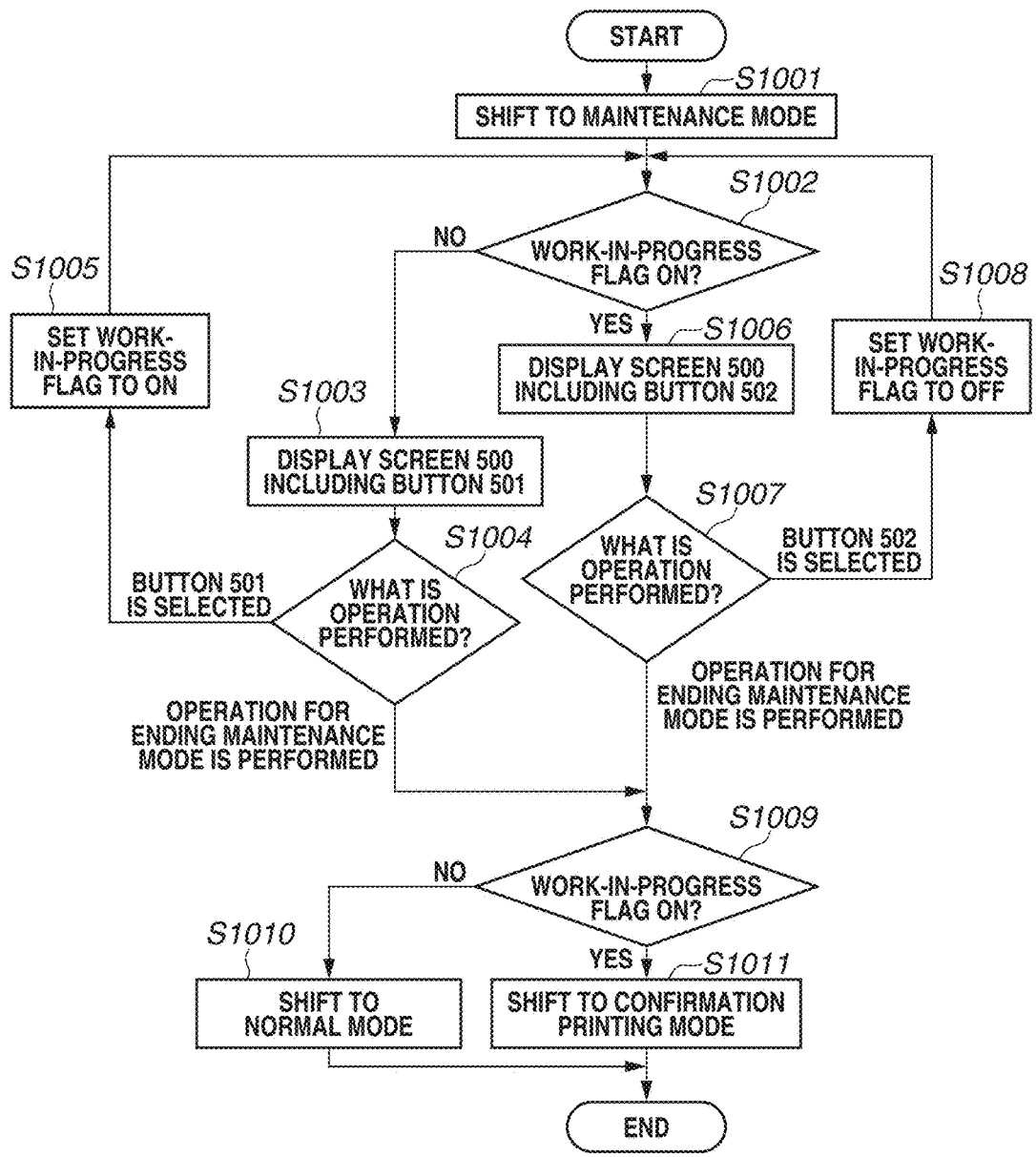
FIG. 7 is a flowchart illustrating processing for setting the operation mode of the MFP to a confirmation printing mode according to one or more aspects of the present disclosure.

FIG. 7 is a flowchart illustrating transition of the operation mode of the MFP 101. The processing procedure illustrated in FIG. 7 is started according to the MFP 101 starting the maintenance mode. The method for the MFP 101 to start the maintenance mode is as described above, in which the maintenance mode is started according to the service engineer performing a special operation.

A program for performing the processing illustrated in FIG. 7 is stored in the ROM 112 or the storage 114, and each processing operation is implemented by the CPU 111 loading the program stored in the ROM 112 or the storage 114 onto the RAM 113 and executing the loaded program.

In step S1001, the CPU 111 changes the operation mode of the MFP 101 to the maintenance mode according to a special operation for shifting to the maintenance mode, which can be known only by the service engineer, being performed in the operation unit 116 of the MFP 101.

Next, in step S1002, the CPU 111 determines whether a work-in-progress flag stored in the RAM 113 is ON or OFF. The work-in-progress flag is a control flag (OFF/ON) used to determine whether the operation mode of the MFP 101 is the confirmation printing mode. Furthermore, control flags about setting of the confirmation printing mode are initialized to OFF at the time of start-up of the MFP 101. Accordingly, when the MFP 101 first enters the maintenance mode after being started up, the work-in-progress flag is OFF.

If the work-in-progress flag is OFF (NO in step S1002), then in step S1003, the CPU 111 displays, on the display 320, the screen 500 which contains the "confirmation printing mode setting" button 501 illustrated in FIG. 4C1.

In step S1004, the CPU 111 determines what is the operation performed by the user in the state in which the screen 500 is displayed on the display 320. Here, a case is described in which the operation performed by the user is any one of pressing of the "confirmation printing mode setting" button 501 and an operation for ending the maintenance mode. With regard to the other operations, processing operations corresponding to the respective items are supposed to be performed by the CPU 111 and are not described in the present flowchart.

If the operation performed by the user is pressing of the "confirmation printing mode setting" button 501 (BUTTON 501 IS SELECTED in step S1004), then in step S1005, the CPU 111 sets the work-in-progress flag to ON and then returns the processing to step S1002.

On the other hand, if, in step S1002, the work-in-progress flag is ON (YES in step S1002), then in step S1006, the CPU 111 displays, on the display 320, the screen 500 which contains the "confirmation printing mode setting cancellation" button 502 illustrated in FIG. 4C2.

Next, in step S1007, the CPU 111 determines what is the operation performed by the user. In the present flowchart, a case is described in which the operation performed by the user is any one of pressing of the "confirmation printing mode setting cancellation" button 502 and an operation for ending the maintenance mode. With regard to the other operations, processing operations corresponding to the respective items are supposed to be performed by the CPU 111 and are not described in the present flowchart.

If it is determined by the CPU 111 that the "confirmation printing mode setting cancellation" button 502 is pressed (BUTTON 502 IS SELECTED in step S1007), then in step S1008, the CPU 111 sets the work-in-progress flag to OFF. Then, the CPU 111 returns the processing to step S1002.

If, in steps S1004 and S1007, the CPU 111 accepts an operation for ending the maintenance mode (OPERATION FOR ENDING MAINTENANCE MODE IS PERFORMED in steps S1004 and S1007), then in step S1009, the CPU 111 determines whether the work-in-progress flag is ON. The operation for ending the maintenance mode is a predetermined special operation which the service engineer performs. Alternatively, when the service engineer does not perform any operation until a predetermined time elapses, displaying of the maintenance mode screen can be ended.

If the work-in-progress flag is ON (YES in step S1009), then in step S1011, the CPU 111 changes the operation mode of the MFP 101 to the confirmation printing mode. When changing the operation mode to the confirmation printing mode, the CPU 111 displays the home screen illustrated in FIG. 4A2 on the display 320. In the description of the present exemplary embodiment, the CPU 111 displays the home screen after changing the operation mode to the confirmation printing mode. However, after the CPU 111 changes the operation mode, a screen corresponding to the screen which is being displayed on the display 320 when the service engineer performs an operation for starting the maintenance mode can be displayed on the display 320. For example, suppose that, when the service engineer performs an operation for starting the maintenance mode, a basic screen for the copy function illustrated in FIG. 4B1 is being displayed. In this case, after ending of the maintenance mode, a basic screen for the copy function at the time of the confirmation printing mode illustrated in FIG. 4B2 can be displayed on the display 320.

If the work-in-progress flag is OFF when an operation for ending the maintenance mode is performed (NO in step S1009), then in step S1010, the CPU 111 changes the operation mode to the normal mode. When changing the operation mode to the normal mode, the CPU 111 displays the home screen illustrated in FIG. 4A1 on the display 320. In the present exemplary embodiment, a case is described as an example in which the home screen is displayed on the display 320 after shifting to the normal mode. However, after the CPU 111 changes the operation mode to the normal mode, a screen corresponding to the screen which is being displayed on the display 320 when the service engineer performs an operation for starting the maintenance mode can be displayed on the display 320. For example, in a case where an operation for starting the maintenance mode is performed on the basic screen for the copy function illustrated in FIG. 4B1, the basic screen for the copy function illustrated in FIG. 4B1 is displayed after ending of the maintenance mode.

In the present exemplary embodiment, a case has been described above in which the CPU 111 performs the processing illustrated in FIG. 7 to set the operation mode of the MFP 101 to the confirmation printing mode. However, the processing for setting the operation mode of the MFP 101 to the confirmation printing mode is not limited to the above-described processing.

For example, in the description of the flowchart illustrated in FIG. 7, when the "confirmation printing mode setting" button 501 is pressed in step S1004, the CPU 111 sets the work-in-progress flag to ON in step S1005 and returns the processing to step S1002. However, in step S1004, the CPU 111 can accept selection of the "confirmation printing mode setting" button 501. Then, in step S1005, the CPU 111 can set the work-in-progress flag to ON, change only the button 501 displayed on the display 320 to the button 502, and then advance the processing to step S1007. In a case where, in step S1007, the "confirmation printing mode setting cancellation" button 502 is selected, then in step S1008, the CPU 111 can set the work-in-progress flag to OFF. Then, the CPU 111 can change a button displayed on the display 320 from the button 502 to the button 501 and then advance the processing to step S1004.

Furthermore, in step S1005, without changing the work-in-progress flag, the CPU 111 can change the "confirmation printing mode setting" button 501 displayed on the display 320 to the "confirmation printing mode setting cancellation" button 502 and then advance the processing to step S1007. Furthermore, in step S1008, without changing the work-in-progress flag, the CPU 111 can change the displayed button from the button 502 to the button 501 and then advance the processing to step S1004. Then, if, in steps S1004 and S1007, an operation for ending the maintenance mode is performed, the CPU 111 can determine which of the button 501 and the button 502 the button that is being displayed on the display 320 is. If the button that is being displayed is the button 501, the CPU 111 can set the work-in-progress flag to OFF and set the operation mode to the normal mode. If the button that is being displayed is the button 502, the CPU 111 can set the work-in-progress flag to ON and set the operation mode to the confirmation printing mode.

Figure 8:
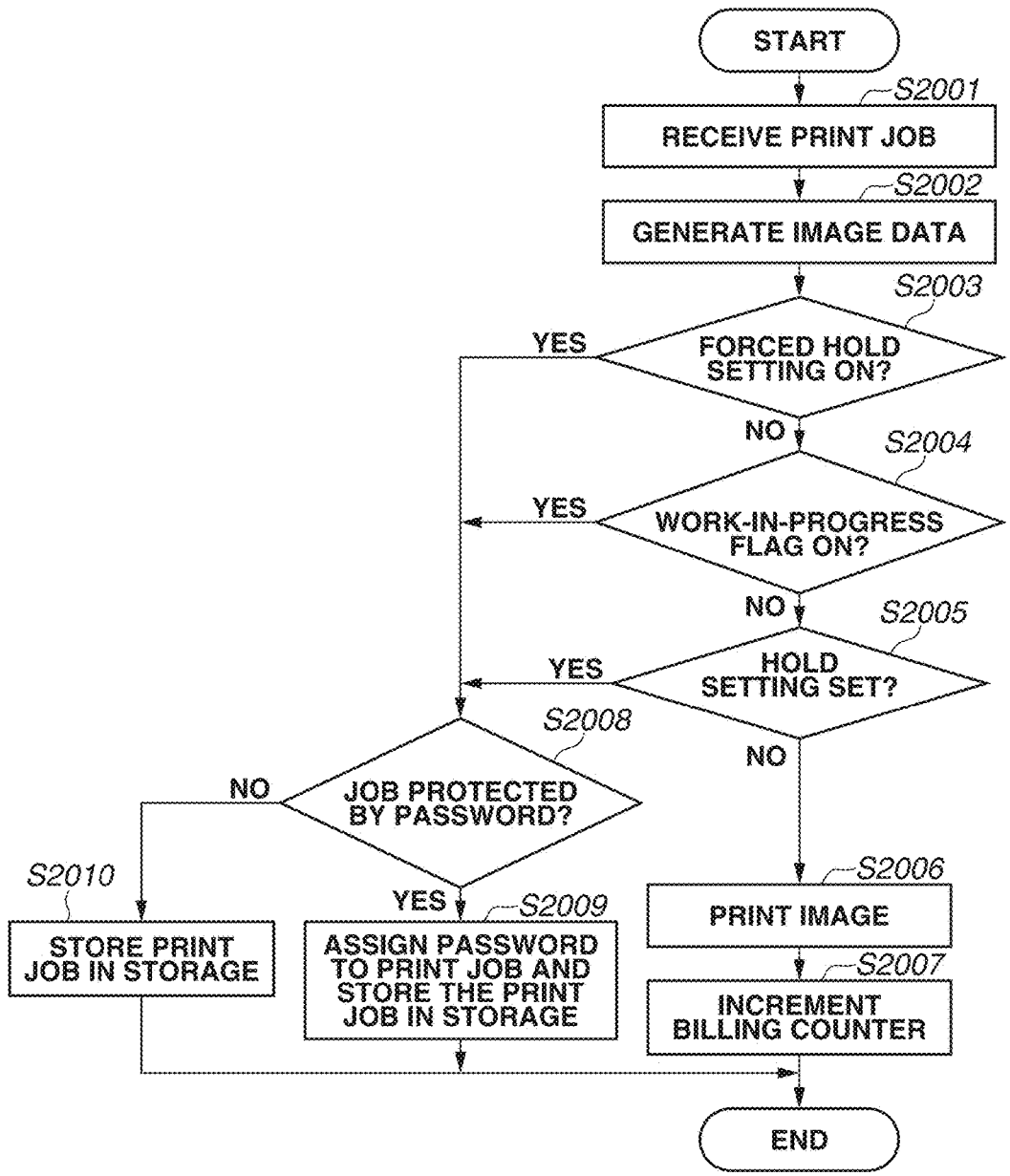
FIG. 8 is a flowchart illustrating processing performed at the time of receiving a print job according to one or more aspects of the present disclosure.

FIG. 8 is a flowchart illustrating the flow of processing which the CPU 111 performs upon receiving a print job from the PC 102 connected thereto via the network 100.

The steps in the flowchart illustrated in FIG. 8 are implemented by the CPU 111 reading out a control program stored in the ROM 112 or the storage 114 onto the RAM 113 and executing the control program. The CPU 111 performs the following processing according to reception of a print job from the PC 102, which is an external apparatus, via the network 100.

In step S2001, the CPU 111 receives a print job from the PC 102. The print job includes, in addition to image data, the settings for printing, the setting as to whether to hold image data in the image forming apparatus, and the setting of a password. For example, the print job includes a flag indicating whether hold setting is performed, which indicates whether the MFP 101 starts printing after receiving a print start instruction upon receiving a print job from the PC 102. ON and OFF of the flag about the hold setting can be changed according to the setting performed via the printer driver 103 of the PC 102.

In the present exemplary embodiment, a case is described as an example in which the CPU 111 receives a print job from the PC 102 via the network 100. However, the print job which the CPU 111 receives in step S2001 is not limited to the above-mentioned print job. For example, a case where the CPU 111 receives a job of receiving facsimile data via a telephone line (not illustrated) and printing the facsimile data can be regarded as a case where the CPU 111 receives a print job.

In step S2002, the CPU 111 generate image data according to the received print job. More specifically, in step S1002, the CPU 111 generates image data in which the setting performed by the user or service engineer via the printer driver 103 is reflected, and stores the generated image data in the RAM 113.

In step S2003, the CPU 111 determines whether the setting of the MFP 101 is ON of the forced hold setting. The forced hold setting is performed by the user via the display 320 of the MFP 101 according to a method (not illustrated). The CPU 111 changes ON and OFF of a flag indicating whether the forced hold setting is set, which is stored in the storage 114, according to the user performing the setting via the display 320. More specifically, in step S2003, the CPU 111 refers to the flag and determines whether the forced hold printing setting is set.

If the forced hold setting is ON (YES in step S2003), then in step S2008, the CPU 111 determines whether the received print job is a job protected by a password. The password used herein is a password which the user sets via the printer driver 103.

If a password is set (YES in step S2008), then in step S2009, the CPU 111 assigns the password to the print job and stores the print job in the storage 114. If no password is set (NO in step S2008), then in step S2010, the CPU 111 stores the print job in the storage 114. In this way, when receiving a print job in which the forced hold setting is set, the MFP 101 holds the print job in the storage 114 without immediately starting printing.

If the forced hold setting is not set (NO in step S2003), then in step S2004, the CPU 111 determines whether the work-in-progress flag is ON.

If the work-in-progress flag is ON (YES in step S2004), the operation mode of the MFP 101 is the confirmation printing mode. When the operation mode of the MFP 101 is the confirmation printing mode, then in step S2008, the CPU 111 determines whether the received print job is a job protected by a password. If the received print job is a job protected by a password (YES in step S2008), then in step S2009, the CPU 111 assigns the password to the print job and stores the print job in the storage 114. If, in step S2008, no password is set to the print job (NO in step S2008), then in step S2010, the CPU 111 stores the print job in the storage 114. As mentioned above, during setting of the confirmation printing mode, a print job is stored in the storage 114 of the MFP 101 irrespective of the setting performed via the printer driver 103 of the PC 102. In this way, during setting of the confirmation printing mode, a print job received from the PC 102 can be prevented from being immediately started.

If, in step S2004, the work-in-progress flag is not ON, in other words, the work-in-progress flag is OFF (NO in step S2004), the operation mode of the MFP 101 is the normal mode. If the operation mode of the MFP 101 is the normal mode, then in step S2005, the CPU 111 determines whether the hold setting is set to the received print job. The setting as to whether to hold a print job is set by the user performing a setting operation on the print job using the printer driver 103 included in the PC 102. The CPU 111 refers to a flag indicating whether the hold setting is set included in the print job, and determines whether the hold setting is set to the received print job.

If the received job is a job to which the hold setting is not set (NO in step S2005), then in step S2006, the CPU 111 prints an image based on the image data generated in step S2002. Here, an image which is based on image data input by the user from the PC 102 and in which the settings performed by the user via the printer driver 103 are reflected is printed. Then, after printing the image, in step S2007, the CPU 111 increments the counting of the billing counter by the number of printed sheets used for printing.

If the hold setting is set to the received print job (YES in step S2005), then in step S2008, the CPU 111 determines whether the received print job is a print job protected by a password. The password is set by the user via the printer driver 103 of the PC 102.

If the received print job is a print job protected by a password (YES in step S2008), then in step S2009, the CPU 111 stores the print job, which includes the image data generated in step S2002, and the password in the storage 114 while associating them with each other.

If the received print job is not a print job protected by a password (NO in step S2008), then in step S2010, the CPU 111 stores the print job, which includes the image data generated in step S2002, in the storage 114.

Figure 9:
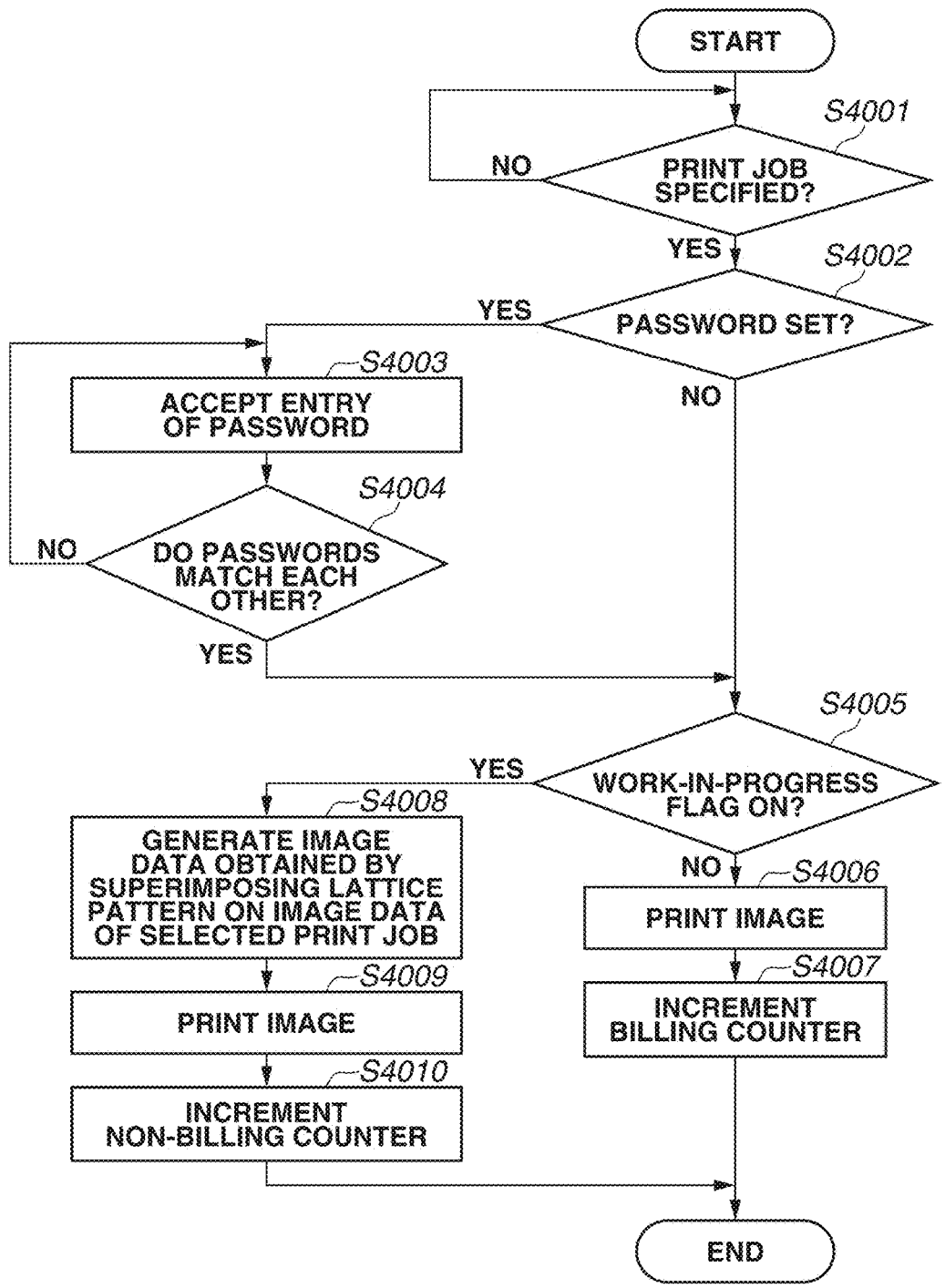
FIG. 9 is a flowchart illustrating processing performed when a print job for printing has been specified according to one or more aspects of the present disclosure.

FIG. 9 is a flowchart illustrating the flow of processing which the CPU 111 performs when the user or service engineer has specified a job for printing via the job status screen 604 displayed on the display 320.

The steps in the flowchart illustrated in FIG. 9 are implemented by the CPU 111 reading out a control program stored in the ROM 112 or the storage 114 onto the RAM 113 and executing the control program.

In step S4001, the CPU 111 determines whether a job for printing has been specified. When the user selects a job for printing with a touch or key operation on the job status screen 604, the CPU 111 determines that a print job has been specified. If a print job has not been specified (NO in step S4001), the CPU 111 continues displaying the job status screen 604.

If a print job has been specified (YES in step S4001), then in step S4002, the CPU 111 determines whether a password is set to the selected print job.

If a password is set (YES in step S4002), then in step S4003, the CPU 111 displays the password entry screen 800 on the display 320 and accepts entry of the password. The password is entered by the user via the operation unit 116.

According to the user entering the password and pressing the OK key 311, in step S4004, the CPU 111 determines whether the entered password matches a password set via the printer driver 103.

If the password entered by the user is different from the password set via the printer driver 103 (NO in step S4004), the CPU 111 displays the error screen 801 on the display 320. After the "close" button is selected, in step S4003, the CPU 111 accepts re-entry of the password.

If the password entered by the user matches the password set via the printer driver 103 (YES in step S4004), then in step S4005, the CPU 111 determines whether the work-in-progress flag is ON.

If, in step S4002, no password is set to the selected print job (NO in step S4002), then in step S4005, the CPU 111 determines whether the work-in-progress flag is ON.

If, in step S4005, it is determined that the work-in-progress flag is OFF (NO in step S4005), in other words, if the operation mode of the MFP 101 is the normal mode, then in step S4006, the CPU 111 prints an image based on image data of the print job selected in step S4001.

After printing the image, in step S4007, the CPU 111 increments the counting of the billing counter by the number of printed sheets used for printing.

If, in step S4005, it is determined that the work-in-progress flag is ON (YES in step S4005), the operation mode of the MFP 101 is the confirmation printing mode. Then, in step S4008, the CPU 111 generates image data obtained by superimposing a lattice pattern on the image data of the selected print job.

In step S4009, the CPU 111 causes the printing unit 120 to print an image which is based on the image data with the lattice pattern superimposed thereon. Here, an image obtained by superimposing a predetermined pattern image on an image generated based on the settings set by the user via the printer driver 103 is printed. In this way, a printed material printed as test printing during setting of the confirmation printing mode becomes easily recognizable.

After the completion of printing, in step S4010, the CPU 111 increments the counting of the non-billing counter by the number of printed sheets used for printing.

With respect to images printed during setting of the normal mode, the billing counter is incremented, and, with respect to images printed during setting of the confirmation printing mode, the non-billing counter is incremented. In this way, the number of printed sheets for printed materials which are targeted for billing and the number of printed sheets for printed materials which are not targeted for billing can be separately and divisionally counted. Furthermore, counting the number of printed sheets for printed materials which are not targeted for billing enables the service engineer to grasp how many sheets were printed as printing which is not targeted for billing.

Figure 10:
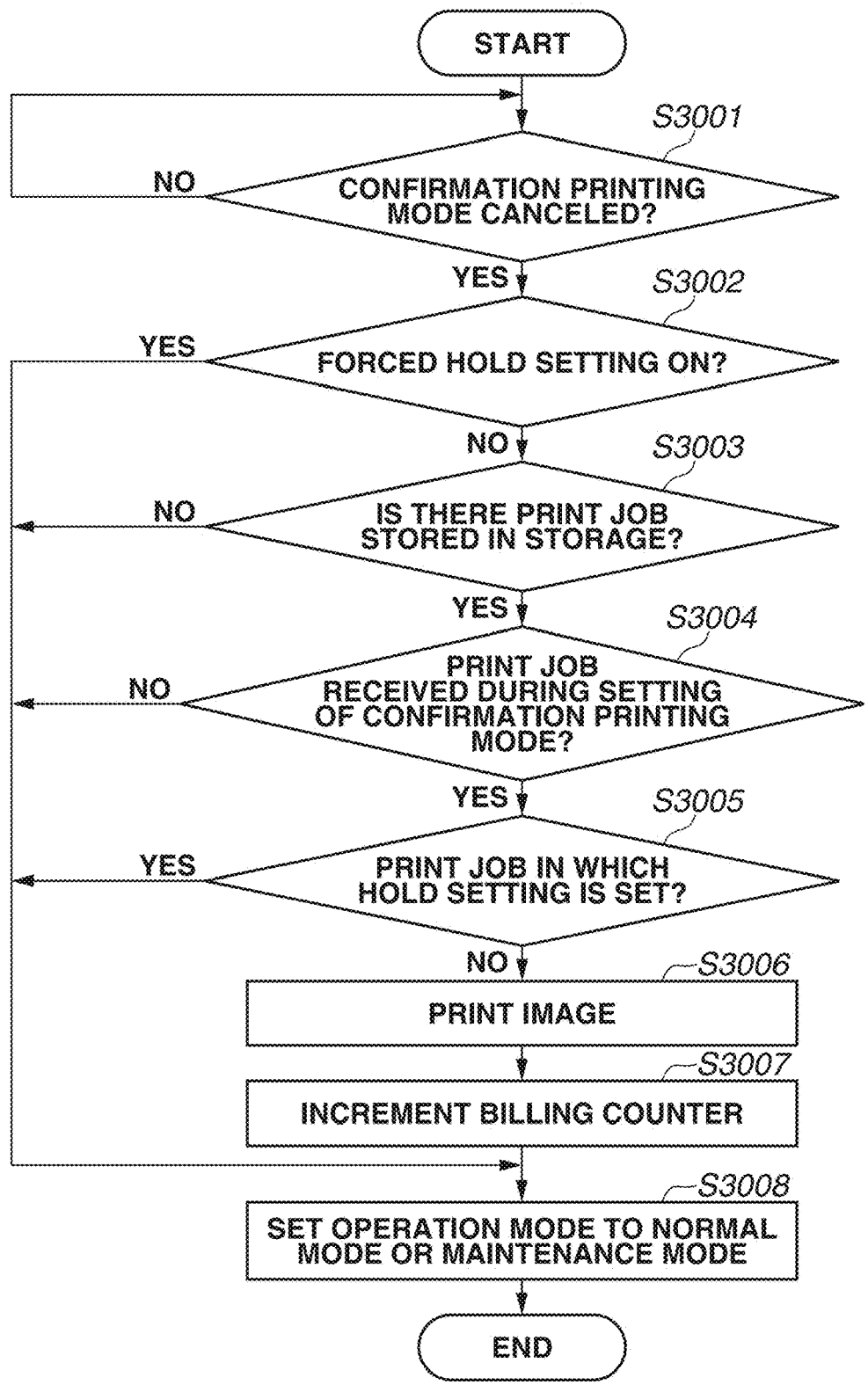
FIG. 10 is a flowchart illustrating processing performed when the confirmation printing mode has been canceled according to one or more aspects of the present disclosure.

FIG. 10 is a flowchart illustrating an operation of the MFP 101 performed when the user has canceled the confirmation printing mode. In the present exemplary embodiment, according to an operation for canceling setting of the confirmation printing mode being performed, a print job in which the hold setting is not set is executed out of print jobs stored in the storage 114 during setting of the confirmation printing mode.

A program for performing the processing illustrated in FIG. 10 is stored in the ROM 112 or the storage 114. Each processing operation is implemented by the CPU 111 loading the program stored in the ROM 112 or the storage 114 onto the RAM 113 and executing the program.

The processing illustrated in the present flowchart is started according to the confirmation printing mode being ended. The service engineer performs a predetermined operation to display the maintenance mode menu screen 500. When the service engineer selects the "confirmation printing mode setting cancellation" button 502, the confirmation printing mode is ended. Furthermore, when a predetermined time elapses after setting of the confirmation printing mode, the confirmation printing mode is ended. In the description of the present exemplary embodiment, the confirmation printing mode is ended according to any one of the above two methods.

In step S3001, the CPU 111 determines whether an operation for canceling the confirmation printing mode has been performed during setting of the confirmation printing mode. The operation for canceling the confirmation printing mode is a special operation which is known only by the service engineer.

If the operation for canceling the confirmation printing mode is not detected (NO in step S3001), the CPU 111 continues operating in the confirmation printing mode.

If the confirmation printing mode has been canceled (YES in step S3001), then in step S3002, the CPU 111 determines whether the forced hold setting is set to the MFP 101. The CPU 111 refers to a flag indicating whether the forced hold setting is set to the MFP 101 stored in the storage 114, and determines whether the forced hold setting is set. If the forced hold setting is set (YES in step S3002), then in step S3008, the CPU 111 sets the operation mode of the MFP 101 to the normal mode or the maintenance mode. To which of the normal mode and the maintenance mode the operation mode is set differs according to the method for ending the confirmation printing mode. For example, in a case where the user ends the confirmation printing mode by selecting the "confirmation printing mode setting cancellation" button 502 from the maintenance mode menu screen 500, the CPU 111 sets the operation mode to the maintenance mode in step S3008. On the other hand, in a case where the confirmation printing mode is ended according to the elapse of a predetermined time from the time of setting of the confirmation printing mode, the CPU 111 sets the operation mode to the normal mode.

If the forced hold setting is not set to the MFP 101 (NO in step S3002), then in step S3003, the CPU 111 determines whether there is a print job stored in the storage 114.

If there is a print job stored in the storage 114 (YES in step S3003), then in step S3004, the CPU 111 determines whether the print job stored in the storage 114 is a print job received during setting of the confirmation printing mode. The method for specifying a print job received during setting of the confirmation printing mode can be any method. For example, the CPU 111 stores the time at which the confirmation printing mode was set and the time at which the confirmation printing mode was canceled, and regards a print job received at a time within a period for which the confirmation printing mode was set as a print job received during setting of the confirmation printing mode.

In step S3005, the CPU 111 determines whether a print job received during setting of the confirmation printing mode, out of print jobs stored in the storage 114, is a print job in which the hold setting is set. The CPU 111 refers to a flag about the hold setting included in a print job, and determines whether the print job is a print job in which the hold setting is set.

If the print job is not a print job in which the hold setting is set (NO in step S3005), then in step S3006, the CPU 111 prints an image which is based on image data of the print job.

Since printing is performed after the operation for ending the confirmation printing mode is performed, then in step S3007, the CPU 111 increments the billing counter by the number of printed sheets used for printing.

After incrementing the billing counter, then in step S3008, the CPU 111 sets the operation mode to the normal mode or the maintenance mode.

If, in step S3003, there is no print job stored in the storage 114 (NO in step S3003), then in step S3008, the CPU 111 sets the operation mode to any one of the normal mode and the maintenance mode according to the method for canceling the confirmation printing mode.

If, in step S3004, the print job stored in the storage 114 is not a print job received during setting of the confirmation printing mode (NO in step S3004), the CPU 111 performs the processing in step S3008.

If, in step S3005, the print job stored in the storage 114 and received during setting of the confirmation printing mode is a print job in which the hold setting is set (YES in step S3005), the CPU 111 performs the processing in step S3008.

After performing the above-described processing, the CPU 111 ends the processing illustrated in FIG. 10.

According to the processing illustrated in FIG. 10 being performed, a print job received from the general user other than the service engineer during setting of the confirmation printing mode can be printed without addition of a predetermined pattern image after reception of cancellation of setting of the confirmation printing mode.

As described above, according to the present exemplary embodiment, when the confirmation printing mode, in which test printing is performed for the service engineer to confirm a printed result of the printed material printed by the printing unit 120, is set, a print job received from an information processing apparatus can be stored in the image forming apparatus.

The MFP 101 holds image data received from the PC 102 during setting of the confirmation printing mode, and performs printing based on a print start instruction. This enables preventing printing of an image with a lattice pattern attached thereto with regard to image data received from the PC 102 from being immediately started. During setting of the normal mode, the timing for starting printing of an image is determined according to the setting of each image received from the PC 102. For example, when the hold setting is not set to image data, the MFP 101 receives the image data from the PC 102 and immediately starts printing. When the hold setting is set to image data, the MFP 101 receives the image data from the PC 102 and then starts printing of an image after accepting a user operation for starting printing of the image data.

According to the present exemplary embodiment, image data received from the PC 102 during setting of the confirmation printing mode can be held without the service engineer manually changing the forced hold setting of the MFP 101 at the time of setting the confirmation printing mode. In this way, the trouble in which the service engineer manually changes the forced hold setting at the time of setting the confirmation printing mode can be saved.

In the first exemplary embodiment, during setting of the confirmation printing mode, image data received from an information processing apparatus is stored in the MFP 101, and printing is started based on an instruction for starting printing from the service engineer. However, in the first exemplary embodiment, in a case where the user performs an operation to display the job status screen and selects a job during setting of the confirmation printing mode, an image with a predetermined pattern image superimposed thereon would be printed. Therefore, in a second exemplary embodiment, a password that is known only by the service engineer is assigned to a print job received from an information processing apparatus during setting of the confirmation printing mode, and the print job with the password assigned thereto is then stored in the image forming apparatus. This enables preventing the general user other than the service engineer from performing an operation to print a job during setting of the confirmation printing mode.

An operation of the MFP 101 according to the second exemplary embodiment is described with reference to FIGS. 5A1, 5A2, 5A3, 5B1, 5B2, 5B3, 5C1, and 5C2.

During setting of the confirmation printing mode, the service engineer transmits a print job using the PC 102. At this time, a password that is known only by the service engineer is assigned to the print job transmitted by the user using the PC 102. This password is a password which is assigned irrespective of the settings in the printer driver 103 and is a predetermined password. Then, this password is known only the service engineer and is not disclosed to the general user. Furthermore, during setting of the confirmation printing mode, a password that is known only by the service engineer is assigned to the received job and all of the print jobs stored in the storage 114. This enables preventing the general user from performing an operation to print an image during setting of the confirmation printing mode.

Then, the service engineer presses the status confirmation button 302 of the operation unit 116 of the MFP 101 to display the status confirmation screen 600 on the display 320.

Furthermore, the service engineer selects the "copy/print job" button 601 in the status confirmation screen 600 to display the copy/print job screen 602 on the display 320.

Then, the service engineer selects the "job status" button 603 in the copy/print job screen 602 to display the job status screen 604 on the display 320. This enables the service engineer to select a print job for test printing from the print jobs held in the storage 114.

When the service engineer selects a print job for printing in the job status screen 604, the password entry screen 800 illustrated in FIG. 5C1 is displayed on the display 320. The password entry screen 800 is used by the service engineer to enter a password via the operation unit 116. According to the service engineer entering a password and pressing the OK key 311, the CPU 111 performs authentication of the password.

In a case where the entered password is a wrong password in the password entry screen 800 illustrated in FIG. 5C1, the error screen 801 is displayed on the display 320 of the MFP 101. The service engineer can select the "close" button to change the screen displayed on the display 320 to the password entry screen 800.

In a case where the entered password is a correct password in the password entry screen 800 illustrated in FIG. 5C1, the CPU 111 starts printing of the selected image. At this time, the operation mode of the MFP 101 is the confirmation printing mode. Therefore, the MFP 101 superimposes a lattice pattern on an image generated from image data of a print job intended for printing, and prints the image. In the second exemplary embodiment, pressing the OK key 311 with the password entry screen 800 displayed serves as a print start instruction to start printing.

After the service engineer ends the confirmation printing mode, printing of images without addition of a pattern image is started based on image data of print jobs received from the PC 102 and stored in the storage 114 during setting of the confirmation printing mode.

A difference from the first exemplary embodiment is described about the processing concerning the setting of the confirmation printing mode in the second exemplary embodiment with reference to FIG. 7.

In the second exemplary embodiment, in step S1009, the CPU 111 changes the operation mode to the confirmation printing mode and displays the home screen for setting of the confirmation printing mode illustrated in FIG. 4A2. Moreover, the CPU 111 assigns a password exclusively used for the service engineer to all of the print jobs stored in the storage 114. This enables preventing the user who transmitted a print job prior to setting of the confirmation printing mode from performing a printing operation during setting of the confirmation printing mode to print an image with a pattern image superimposed thereon.

FIG. 11 is a flowchart illustrating processing performed when the MFP 101 has received a print job from the PC 102.

A program for performing the processing illustrated in FIG. 11 is stored in the ROM 112 or the storage 114. The processing is implemented by the CPU 111 loading the program stored in the ROM 112 or the storage 114 onto the RAM 113 and executing the program.

Processing operations in steps S2001 to S2010 are similar to the processing operations illustrated in FIG. 8, and are, therefore, omitted from the description.

In a case where, in step S2004, the CPU 111 determines that the work-in-progress flag is ON (YES in step S2004), the operation mode of the MFP 101 is the confirmation printing mode. If the operation mode set in the MFP 101 is the confirmation printing mode, then in step S5001, the CPU 111 assigns a password exclusively used for the service engineer to the received print job and then stores the print job in the storage 114. The password exclusively used for the service engineer is previously stored in the storage 114 or the SRAM 125 in the MFP 101. The above password is a password determined at the time of factory shipment, and is different from a password set by the user or service engineer using the printer driver 103. Here, in a case where a password is set with the use of the printer driver 103, a print job also retains the password set with the use of the printer driver 103. After storing the print job in the storage 114, the CPU 111 ends the processing illustrated in FIG. 11.

According to the processing in step S5001 being performed, even in a case where the forced hold setting of the MFP 101 is set to OFF with respect to a print job received from the PC 102 during setting of the confirmation printing mode, printing of image data of the print job is not immediately started and the image data can be stored in the storage 114. Furthermore, assigning a password exclusively used for the service engineer enables preventing the general user from starting printing during setting of the confirmation printing mode.

Processing performed when a job intended for printing has been selected in a case where the job status screen 604 is displayed on the display 320 is described with reference to the flowchart of FIG. 9.

In the second exemplary embodiment, only a difference from the first exemplary embodiment is described.

If, in step S4002, the CPU 111 determines that the selected print job has a password assigned thereto (YES in step S4002), then in step S4003, the CPU 111 displays the password entry screen 800 on the display 320. The password can be entered via the hard keys or touch panel of the operation unit 116.

In response to the OK key 311 being pressed, in step S4004, the CPU 111 determines whether the entered password matches the password assigned to the print job. At this time, if the operation mode of the MFP 101 is the confirmation printing mode, the CPU 111 compares the entered password and the password exclusively used for the service engineer with each other, and, if those match each other, the processing proceeds to step S4005. On the other hand, if the operation mode of the MFP 101 is the normal mode, the CPU 111 determines whether the entered password and the password set via the printer driver 103 match each other.

In the description of the first exemplary embodiment, If, in step S4002, the selected print job has no password assigned thereto, the CPU 111 determines whether the work-in-progress flag is ON.

In the second exemplary embodiment, during setting of the confirmation printing mode, the password exclusively used for the service engineer is assigned to all of the jobs stored in the storage 114. If, in step S4002, it is determined that the selected print job has no password assigned thereto (NO in step S4002), the operation mode of the MFP 101 is the normal mode. Therefore, in the second exemplary embodiment, according to the CPU 111 determining that the selected print job has no password assigned thereto in step S4002, the CPU 111 advances the processing to step S4006 without performing processing in step S4005.

On the other hand, if, in step S4002, the specified print job has a password assigned thereto (YES in step S4002), then in steps S4003 and S4004, the CPU 111 receives entry of the password and performs authentication processing to determine whether the passwords match each other. Then, in step S4005, the CPU 111 determines whether the work-in-progress flag is ON. If the work-in-progress flag is ON (YES in step S4005), the CPU 111 determines that the operation mode is the confirmation printing mode and performs processing in steps S4008 to S4010. If the work-in-progress flag is OFF (NO in step S4005), the CPU 111 determines that the operation mode is the normal mode and performs processing in steps S4006 and S4007.

According to the above processing illustrated in FIG. 11 and FIG. 9 being performed, a password exclusively used for the service engineer is assigned to a print job received by the MFP 101 during setting of the confirmation printing mode, so that printing by the general user can be prevented.

Processing performed when the confirmation printing mode has been canceled is described with reference to FIG. 10. Processing operations in steps S3001 to S3004, S3006, and S3007 are similar to those in the first exemplary embodiment.

In the description of the first exemplary embodiment, in step S3006, the CPU 111 prints an image received during setting of the confirmation printing mode. However, in the second exemplary embodiment, the CPU 111 cancels the assigned password exclusively used for the service engineer and causes the printing unit 120 to print an image. At this time, with respect to a print job to which, besides the password exclusively used for the service engineer, the password set via the printer driver 103 is assigned, the CPU 111 cancels the assigned password exclusively used for the service engineer and assigns the password set via the printer driver 103. Since the print job to which the password is set via the printer driver 103 is a print job to which the hold setting is set, the CPU 111 performs processing in step S3008 without performing printing.

In the second exemplary embodiment, in the case of printing an image held in the MFP 101 during setting of the confirmation printing mode, a password that is known only by the service engineer is entered to start printing. In this way, even in a case where the general user other than the service engineer is going to perform printing via the job status screen 604 during setting of the confirmation printing mode, printing can be prevented from being started.

In the description of the second exemplary embodiment, a password exclusively used for the service engineer is entered to print an image of a print job stored in the storage 114. However, instead of a password exclusively used for the service engineer, for example, a dedicated IC card that is held only by the service engineer can be authenticated to print an image stored in the storage 114.

In the description of the second exemplary embodiment, according to the service engineer selecting a print job intended for printing, the password entry screen 800 is displayed on the display 320. However, the timing of displaying the password entry screen 800 does not need to be the above-mentioned timing. For example, according to the service engineer pressing the status confirmation button 302, the CPU 111 can display the password entry screen 800 on the display 320. Furthermore, the CPU 111 can display the password entry screen 800 on the display 320 at the time of selecting the "copy/print job" button 601 or at the time of selecting the "job status" button 603.

In the description of the second exemplary embodiment, a password determined at the time of factory shipment is assigned to a print job received from the PC 102 during setting of the confirmation printing mode, and the print job is stored in the storage 114. The password is not limited to the one determined in the above method. For example, the service engineer can set a password via a password setting screen (not illustrated) which is displayed on the display 320 at the time of setting the confirmation printing mode. At this time, until the confirmation printing mode is ended after the service engineer enters a password, the password set by the service engineer is assigned to a print job stored in the storage 114.

In the description of the first and second exemplary embodiments, the MFP 101 is equipped with a billing counter for counting the number of printed sheets of a printed material serving as a target for billing and a non-billing counter for counting the number of printed sheets of a printed material excluded from targets for billing. However, the MFP 101 can be equipped only with the billing counter without being equipped with the non-billing counter for counting the number of printed sheets of a printed material not serving as a target for billing. Furthermore, in the description of the first and second exemplary embodiments, the number of printed sheets of a printed material printed in the maintenance mode and in the confirmation printing mode is counted by the non-billing counter. However, updating of the non-billing counter can be configured not to be performed with respect to some print jobs not targeted for billing, in such a manner that, for example, updating of the non-billing counter is not performed with respect to test printing in the maintenance mode.

Moreover, in the first and second exemplary embodiments, counting of each of the billing counter and the non-billing counter is incremented by one each time the number of printed sheets increases by one. However, counting of each of the billing counter and the non-billing counter can be incremented by one each time one job is executed, or can be incremented according to, for example, the used amount of toner.

In the description of the first and second exemplary embodiments, in a case where printing is performed during setting of the confirmation printing mode, a lattice pattern is superimposed on an image generated based on image data received from an information processing apparatus, such as a PC, and the resultant image is printed. However, a pattern image to be superimposed on an image is not limited to the lattice pattern. The pattern image can be a predetermined stamp or a pattern such as a copy-forgery-inhibited pattern.

In the description of the first and second exemplary embodiments, the processing operations illustrated in FIG. 7 to FIG. 11 are performed by the CPU 111 included in the MFP 101. However, these processing operations can be performed by a CPU of, for example, a computer connected to the MFP 101 via, for example, a network.

In the description of the first and second exemplary embodiments, image data of a print job received from the PC 102 during setting of the confirmation printing mode is stored in the storage 114 included in the MFP 101. However, the location in which image data is stored is not limited to the above location. For example, image data can be stored in a server or a storage of another MFP connected to the MFP 101 via a network.

In the description of the first and second exemplary embodiments, during setting of the confirmation printing mode, a job for printing is stored in the storage 114 irrespective of the type of the job, and an image with a predetermined pattern image superimposed thereon is printed according to a print start instruction from the service engineer. However, image data received by the MFP 101 may include a job which is intended to be immediately printed after reception, such as facsimile (fax) data. Therefore, with regard to a predetermined type of job, such as fax, even during setting of the confirmation printing mode, printing can be started immediately after reception of a job. Moreover, in a case where a predetermined type of job is received, an image can be printed based on the received image data without addition of a predetermined pattern image.

According to image forming apparatuses disclosed in the present specification, in an image forming apparatus in which the confirmation printing mode is not set during setting of the normal mode, the trouble in which the service engineer sets the forced hold setting at the time of setting the confirmation printing mode can be saved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-144507 filed Jul. 22, 2016, which is hereby incorporated by reference herein in its entirety.

What is claimed is:

1. A printing apparatus comprising:
a printer;
an operation unit that receive a user operation;
one or more memories
a communication interface that receives image data from an information processing apparatus; and
one or more processors that execute a set of instructions to:
set hold print setting of storing the image data received via the communication interface in the one or more memories until a print start instruction is received via the operation unit;
set a predetermined print mode of causing the printer to print an image with addition of a predetermined pattern image to the image data received via the communication interface,
in a case where the predetermined print mode is not set and where the hold print setting is set, store the image data received via the communication interface into the one or more memories, and cause the printer to start printing an image based on the image data stored in the one or more memories in response to receiving a print start instruction via the operation unit,
in a case where the predetermined print mode is not set and where the hold print setting is not set, cause the printer to start printing an image based on the image data received via the communication interface without receiving a print start instruction via the operation unit, and
in a case where the predetermined print mode is set, store the image data received via the communication interface into the one or more memories, and cause the printer to start printing an image with addition of the predetermined pattern image to the image data stored in the one or more memories in response to receiving a print start instruction via the operation unit.

2. The printing apparatus according to claim 1, further comprising a billing counter configured to be updated based on printing by the printer,
wherein counting of the billing counter is not updated even if printing is performed by the printer during a period in which the predetermined print mode is set.

3. The printing apparatus according to claim 2, wherein the billing counter performs counting according to a number of sheets printed by the printer.

4. The printer according to claim 2, further comprising a non-billing counter configured to be updated in accordance with the printing performed during the period in which the predetermined print mode is set.

5. The printing apparatus according to claim 1, wherein the one or more processors that execute the instructions assign a predetermined password to the image data received via the communication interface in a case where the predetermined print mode is set, and store the image data in the one or more memories, receives entry of a password via the operation unit, and causes the printer to start printing according to the entered password matching the predetermined password.

6. The printing apparatus according to claim 5, wherein the predetermined password is a password set at factory shipment.

7. The printing apparatus according to claim 1, wherein the predetermined pattern image is a lattice pattern.

8. The printing apparatus according to claim 1, wherein the one or more processors execute the instructions to;

store the image data received via the communication interface into the one or more memories in a case where the predetermined print mode is set, even if the hold print setting is not set.

9. The printing apparatus according to claim 1, wherein the one or more processors execute the instructions to;
in response to cancellation of the setting of the predetermined print mode, cause the printer to start printing the image based on the image data stored in the one or more memories and received via the communication interface during the period in which the predetermined print mode is set.

10. The printing apparatus according to claim 9,
wherein, among the image data stored in the one or more memories and received via the communication interface during the period in which the predetermined print mode is set, image data to which the hold print setting is added remains stored in the one or more memories even if the setting of the predetermined print mode is canceled.

11. A control method for a printing apparatus, the control method comprising:
receiving by a communication interface, image data from an information processing apparatus;
setting hold print setting of storing the image data received via the communication interface until a print start instruction is received;
setting a predetermined print mode of causing a printer to print an image with addition of a predetermined pattern image to the image data received via the communication interface,
in a case where the predetermined print mode is not set and where the hold print setting is set, store the image data received via the communication interface, and cause the printer to start printing an image based on the image data stored in response to receiving a print start instruction,
in a case where the predetermined print mode is not set and where the hold print setting is not set, cause the printer to start printing an image based on the image data received via the communication interface without receiving a print start instruction, and
in a case where the predetermined print mode is set, store the image data received via the communication interface, and cause the printer to start printing an image with addition of the predetermined pattern image to the image data stored in response to receiving a print start instruction.

12. A non-transitory computer-readable storage medium storing computer-executable instructions which, when executed by a computer, cause the computer to perform a control method for a printing apparatus, the control method comprising:
receiving by a communication interface, image data from an information processing apparatus;
setting hold print setting of storing the image data received via the communication interface until a print start instruction is received;
setting a predetermined print mode of causing a printer to print an image with addition of a predetermined pattern image to the image data received via the communication interface,
in a case where the predetermined print mode is not set and where the hold print setting is set, store the image data received via the communication interface, and cause the printer to start printing an image based on the image data stored in response to receiving a print start instruction,
in a case where the predetermined print mode is not set and where the hold print setting is not set, cause the printer to start printing an image based on the image data received via the communication interface without receiving a print start instruction, and
in a case where the predetermined print mode is set, store the image data received via the communication interface, and cause the printer to start printing an image with addition of the predetermined pattern image to the image data stored in response to receiving a print start instruction.

* * * * *